United States Patent
Nieweglowski et al.

(10) Patent No.: US 6,212,235 B1
(45) Date of Patent: Apr. 3, 2001

(54) VIDEO ENCODER AND DECODER USING MOTION-BASED SEGMENTATION AND MERGING

(75) Inventors: Jacek Nieweglowski, Szczecin (PL); Marta Karczewicz, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/171,390

(22) PCT Filed: Apr. 19, 1996

(86) PCT No.: PCT/EP96/01644
§ 371 Date: Jan. 8, 1999
§ 102(e) Date: Jan. 8, 1999

(87) PCT Pub. No.: WO97/40628
PCT Pub. Date: Oct. 30, 1997

(51) Int. Cl.$^7$ ...................................................... H04N 7/18

(52) U.S. Cl. ............................... 375/240.08; 375/240.09

(58) Field of Search ..................................... 348/416, 169, 348/397, 409, 402; 358/136; 375/240, 240.08, 240.09

(56) References Cited

U.S. PATENT DOCUMENTS

| | | | |
|---|---|---|---|
| 4,989,087 | * 1/1991 | Pele et al. | 358/136 |
| 5,295,201 | 3/1994 | Yokohama | 382/48 |
| 5,504,529 | * 4/1996 | Sugiyama | 348/397 |
| 5,550,847 | * 8/1996 | Zhu | 371/32 |
| 5,627,905 | * 5/1997 | Sebok et al. | 382/107 |
| 5,654,771 | * 8/1997 | Tekalp et al. | 348/699 |
| 5,734,737 | * 3/1998 | Chang et al. | 382/107 |
| 5,982,909 | * 11/1999 | Erdem et al. | 382/103 |
| 6,005,625 | * 12/1999 | Yokoyama | 348/416 |

FOREIGN PATENT DOCUMENTS 0 625 853 A2    11/1994  (EP) .

OTHER PUBLICATIONS

"Efficient Region–Based Motion Estimation And Symmetry Oriented Segmentation For Image Sequence Coding", Cicconi et al., IEEE Transactions on Circuits and Systems for Video Technology, vol. 4, No. 3, pp. 357–364.

"Region–Based Motion Estimation Using Deterministic Relaxation Schemes For Image Sequence Coding", Nicolas et al., Proc. 1992, International Conference on Acoustics, Speech and Signal Processing, pp. III–265–268.

"Matrix Computation", Golub et al., Johns Hopkins University Press, 1989, pp. 211–221.

"Multiresolution Signal Decomposition", Akansu et al., Academic Press Inc., pp. 55–56.

"Representation of motion information for image coding", Nguyen et al., Proc. Picture Coding Symposium '90, Cambridge, MA, pp 8.4–1 –8.4–5.

"Motion Estimation and Representation for Arbitrarily Shaped Image Regions", Karczewicz et al., ICIP '95 vol. 2, Oct. 23, 1995, pp 197–200; European Patent Application No. EP 0625853 A2.

"Segmentation—Based Coding of Motion Difference and Motion Field Images for Low Bit–Rate Video Compression", Liu et al., ICASSP–92, vol. 3, Mar. 23, 1992, pp 525–528.

(List continued on next page.)

*Primary Examiner*—Andy Rao
(74) *Attorney, Agent, or Firm*—Perman & Green, LLP

(57) ABSTRACT

This invention relates to motion compensated (MC) coding of video and to a MC prediction scheme which allows fast and compact encoding of motion vector fields retaining at the same time very low prediction error. By reducing prediction error and number of bits needed for representation of motion vector field, substantial savings of bit rate are achieved. Reduction of bit rate needed to represent motion field is achieved by merging segments in video frames, by adaptation of motion field model and by utilization of motion field model based on orthogonal polynomials.

33 Claims, 7 Drawing Sheets

OTHER PUBLICATIONS

"Segmentation Based on Accumulative Observation of Apparent Motion in Long Image Sequences", IEICE Transactions on Information and Systems, Chen et al., vol. E77–D, No. 6, Jun. 1994, pp 694–704.

Segmentation–based Coding of Motion Fields for Video Compression, Baker et al., Digital Video Compression: Algorithms and Technologies 1996, vol. 2668, Jan. 31, 1996, pp 345–354; and U.S. Patent No. 5,295,201.

PCT International Search Report.

* cited by examiner

---------- SEGMENT BOUNDARIES
—————— FRAME BOUNDRY

VIDEO ENCODER AND DECODER USING MOTION-BASED SEGMENTATION AND MERGING

FIELD OF THE INVENTION

The present invention generally relates to video compression. More precisely, the invention relates to an encoder and method for performing motion compensated encoding of video data. The invention also relates to a decoder for decoding video data thus encoded.

BACKGROUND OF THE INVENTION

Motion compensated prediction is a key element of the majority of video coding schemes. FIG. 1 is a schematic diagram of an encoder for compression of video sequences using motion compensation. Essential elements in the encoder are a motion compensated prediction block 1, a motion estimator 2 and a motion field coder 3. The operating principle of the motion compensating video encoder is to compress the prediction error $E_n(x,y)$, which is a difference between the incoming frame $I_n(x,y)$ to be coded, called the current frame, and a prediction frame $P_n(x,y)$, wherein:

$$E_n(x,y) = I_n(x,y) - P_n(x,y) \qquad (1)$$

Compression of the prediction error $E_n(x,y)$ typically introduces some loss of information. The compressed prediction error, denoted $\tilde{E}_n(x,y)$, is sent to the decoder. The prediction frame $P_n(x,y)$ is constructed by the motion compensated prediction block 1 and is built using pixel values of the previous, or some other already coded frame denoted $R_{ref}(x,y)$, called a reference frame, and motion vectors describing estimated movements of pixels between the current frame and the reference frame. Motion vectors are calculated by motion field estimators 2 and the resulting motion vector field is then coded in some way before applying it to the predictor block 1. The prediction frame is then:

$$P_n(x,y) = R_{ref}[x + \Delta x(x,y), y + \Delta y(x,y)] \qquad (2)$$

The pair of numbers $[\Delta x(x,y), \Delta y(x,y)]$ is called the motion vector of a pixel in location (x,y) in the current frame, whereas $\Delta x(x,y)$ and $\Delta y(x,y)$ are the values of horizontal and vertical displacement of this pixel. The set of motion vectors of all pixels in the current frame $I_n(x,y)$ is called motion vector field. The coded motion vector field is also transmitted as motion information to the decoder.

In the decoder shown in FIG. 2, pixels of the current frame $I_n(x,y)$ are reconstructed by finding the pixels' predictions $P_n(x,y)$ from the reference frame $R_{ref}(x,y)$. The motion compensated prediction block 21 generates the prediction frame using the received motion information and the reference frame $R_{ref}(x,y)$. In the prediction error decoder 22 a decoded prediction error frame $\tilde{E}_n(x,y)$ is then added with the prediction frame, the result being the approximated current frame $\tilde{I}_n$.

The general object of the motion compensated (MC) prediction encoder is to minimise the amount of information which needs to be transmitted to the decoder. It should minimise the amount of prediction error measured according to some criteria, e.g. the energy associated with $E_n(x,y)$, and minimise the amount of information needed to represent the motion vector field.

The document N. Nguen, E. Dubois, "Representation of motion information for image coding". Proc. Picture Coding Symposium '90, Cambridge, Mass., Mar. 26–18, 1990, pages 841–845, gives a review of motion field coding techniques.

As a rule of the thumb, a reduction of prediction error requires a more refined sophisticated motion field, i.e. more bits must be spent on its encoding. Therefore the overall goal of the video encoding is to encode the motion vector field as compactly as possible keeping at the same time the measure of prediction error as low as possible.

Due to the very large number of pixels in the frame, it is not efficient to transmit a separate motion vector for each pixel. Instead, in most of the video coding schemes the current frame is divided into image segments, as shown for example in FIG. 3, so that all motion vectors of the segment can be described by a few parameters. Image segments can be square blocks. For example 16×16 pixel blocks are used in codecs in accordance with international standard ISO/IEC MPEG-1 or ITU-T H.261, or they can comprise completely arbitrarily shaped regions obtained for instance by a segmentation algorithm. In practice segments include at least a few tens of pixels.

The motion field estimation block 1 of FIG. 1 calculates motion vectors of all the pixels of a given segment which minimise some measure of prediction error in this segment, for example the square prediction error. Motion field estimation techniques differ both in the model of the motion field and in the algorithm for minimisation of the chosen measure of prediction error.

In order to compactly represent the motion vectors of the pixels in the segments it is desirable that their values are described by a function of few parameters. Such a function is called a motion vector field model. A known group of models are linear motion models, in which motion vectors are approximated by linear combinations of motion field basis functions. In such models the motion vectors of image segments are described by a general formula:

$$\Delta x(x, y) = \sum_{i=1}^{N} c_i f_i(x, y) \qquad (3)$$

$$\Delta y(x, y) = \sum_{i=N+1}^{N+M} c_i f_i(x, y)$$

where parameters $c_i$ are called motion coefficients and are transmitted to the decoder. Functions $f_i(x,y)$ are called motion field basis functions and they have a fixed form known to both encoder and decoder.

The problem when using the linear motion model having the above described formula is how to minimise in a computationally simple manner the number of motion coefficients $c_i$ which are sent to the decoder, keeping at the same time some measure of distortion, e.g. a chosen measure of prediction error $E_n(x,y)$, as low as possible.

The total amount of motion data which needs to be sent to the decoder depends both on the number of segments in the image and the number of motion coefficients per segment. Therefore, there exist at least two ways to reduce the total amount of motion data.

The first way is to reduce the number of segments by combining (merging) together those segments which can be predicted with a common motion vector field model without causing a large increase of prediction error. The number of segments in the frame can be reduced because very often adjacent, i.e. neighbouring, segments can be predicted well with the same set of motion coefficients. The process of combining such segments is called motion assisted merging. FIG. 3 shows a frame divided into segments. The prior art techniques for motion coefficient coding include several techniques for motion assisted merging. After motion vectors of all the segments have been estimated, motion assisted merging is performed. It is done by considering every pair of adjacent segments $S_i$ and $S_j$ with their respective motion coefficients $c_i$ and $c_j$. The area of combined segments $S_i$ and $S_j$ is denoted $S_{ij}$. If the area $S_{ij}$ can be predicted with one set of motion coefficients $c_{ij}$ without causing excessive increase of prediction error over the error resulting from separate predictions of $S_i$ and $S_j$, then $S_i$ and $S_j$ are merged. The methods for motion assisted merging differ essentially in the way of finding a single set of motion coefficients $c_{ij}$ which allow a good prediction of segments combined together.

One method is known as merging by exhaustive motion estimation. This method estimates "from scratch" a new set of motion parameters $c_{ij}$ for every pair of adjacent segments $S_i$ and $S_j$. If the prediction error for $S_{ij}$ is not excessively increased then the segments $S_i$ and $S_j$ are merged. Although this method can very well select the segments which can be merged it is not feasible for implementation because it would increase the complexity of the encoder typically by several orders of magnitude.

Another method is known as merging by motion field extension. This method tests whether area of $S_{ij}$ can be predicted using either motion parameters $c_i$ or $c_j$ without an excessive increase of the prediction error. This method is characterised by very low computational complexity because it does not require any new motion estimation. However, it very often fails to merge segments because motion compensation with coefficients calculated for one segment very rarely predicts well also the adjacent segments.

Still another method is known as merging by motion field fitting. In this method the motion coefficients $c_{ij}$ are calculated by the method of approximation. This is done by evaluating a few motion vectors in each of the segments. Some motion vectors in segments $S_i$ and $S_j$ are depicted in FIG. 4. The motion field for the segment $S_{ij}$ is determined by fitting a common motion vector field through these vectors using some known fitting method. The disadvantage of the method is that the motion field obtained by fitting is not precise enough and often leads to an unacceptable increase of prediction error.

The second way to minimise the number of motion coefficients is to select for each segment a motion model which allows achieving satisfactorily low prediction error with as few coefficients as possible. Since the amount and the complexity of the motion varies between frames and between segments it is not efficient to always use all N+M motion coefficients per segment. It is necessary to find out for every segment what is the minimum number of motion coefficients which yields a satisfactorily low prediction error. Such a process of adaptive selection of coefficients is called motion coefficient removal.

Methods for performing motion estimation with different models and selecting the most suitable one are proposed in H. Nicolas and C. Labit, "Region-based motion estimation using deterministic relaxation schemes for image sequence coding," Proc. 1994 International Conference on Acoustics, Speech and Signal Processing, pp. III265–268 and P. Cicconi and H. Nicolas, "Efficient region-based motion estimation and symmetry oriented segmentation for image sequence coding," IEEE Tran. on Circuits and Systems for Video Technology, Vol. 4, No. 3, June 1994, pp. 357–364. The methods try to adapt the motion model depending on the complexity of the motion by performing motion estimation with different models and selecting the most suitable one. The main disadvantage of these methods is their high computational complexity and the small number of different motion field models which can be tested in practice.

Although the afore-described methods reduce the amount of motion information sent to the decoder to some extent while maintaining the accuracy of predicted image at a reasonable level, there is still a desire to further reduce that amount.

SUMMARY OF THE INVENTION

An object of the present invention is to create a motion compensated video encoder and a method of motion compensated encoding of video data and a video decoder for decoding motion compensation encoded video data, which allow reducing the amount of motion vector field data produced by some known motion estimator by a large factor without causing an unacceptable distortion of the motion vector field. The complexity of the motion field encoder should preferably be low for allowing practical implementation on available signal processors or general purpose microprocessors.

According to a first aspect of the invention, an encoder for performing motion compensated encoding of video data, comprising:

motion field estimating means, having an input for receiving a first video data frame $I_n$ and a reference frame $R_{ref}$, said motion field estimating means being arranged to estimate a motion vector field $(\Delta X, \Delta Y)$ describing scene motion displacements of video frame pixels, and having an output for outputting said first video frame, said motion vector field and said reference frame $R_{ref}$;

motion field encoding means having an input to receive from said motion field estimating means said first estimated motion vector field; partitioning of a video frame into at least two segments said segments being a first segment $S_i$ and a second segment $S_j$; said first video data frame and said reference frame $R_{ref}$, said motion field encoding means being arranged to obtain compressed motion information comprising first motion coefficients representing said motion vector field;

motion compensated prediction means for predicting a predicted video data frame based on said reference frame $R_{ref}$ and said compressed motion information;

computing means having an input for receiving said first video data frame and said predicted video data frame, said computing means being arranged to calculate a prediction error frame based on said predicted video data frame and on said first video data frame;

prediction error encoding means for encoding said prediction error frame;

means for transmitting said first motion coefficients and said prediction error frame to a decoder;

is characterised by said motion encoding means further comprising:

means, for calculating and storing for each segment a distortion matrix E and a distortion vector y such that a predefined measure $\Delta E$ for distortion in each segment, due to approximating said motion vector field as coefficients $c_i$ of a set of polynomial basis functions $f_i$, is a function of (E c−y), c being a vector of said motion coefficients $c_i$;

means for decomposing said distortion matrix E into a first matrix Q and a second matrix R such that
det Q≠0 and
Q R=E,
a subset of the set of all columns of matrix Q being a basis of a vector space defined by all possible linear combinations of all column vectors of matrix E, columns of matrix Q being orthogonal to each other;

means for calculating an auxiliary vector z according to $z=Q^{-1} y$, $Q^{-1}$ being the inverse matrix of said first matrix Q;

means for generating for each segment a column extended matrix A comprising the columns of matrix R and vector z as an additional column, and for selecting all rows of matrix A which have elements unequal to zero in all columns due to R;

means for merging segments based on selective combination of segments producing an increase in said prediction error within a certain limit;

means for generating a row extended matrix B comprising said selected rows of matrix A of said first segment $S_i$ and said selected rows of matrix A of said second segment $S_j$;

means for performing a series of multiplications of rows of matrix B with scalars unequal to zero and additions of rows of matrix B in order to obtain a modified matrix B' having in the columns due to matrix R as many rows as possible filled with zeros;

orthogonalising means receiving one of said matrices A, B and B' as an input matrix M, said orthogonalising means being arranged to replace said polynomial basis functions with $f_i$ by orthogonal basis functions $\tilde{f}_i$ and to calculate second motion coefficients $\tilde{c}$ using said orthogonal basis functions and said input matrix M; and quantisation means, having an input for receiving said second motion coefficients $\tilde{c}$, said quantisation means being arranged to quantise said second coefficients $\tilde{c}$.

According to a second aspect of the invention, an encoder for performing motion compensated encoding of video data, comprising:

motion field estimating means, having an input for receiving a first video data frame $I_n$ and a reference frame $R_{ref}$, said motion field estimating means being arranged to estimate a motion vector field $(\Delta X, \Delta Y)$ describing scene motion displacements of video frame pixels and having an output to output said first video frame, said motion vector field and said reference frame $R_{ref}$;

motion field encoding means having an input to receive from said motion field estimating means said first estimated motion vector field; partitioning of a video frame into at least two segments said segments being a first segment $S_i$ and a second segment $S_j$; said first video data frame and said reference frame $R_{ref}$, said motion field encoding means being arranged to obtain compressed motion information comprising first motion coefficients representing said motion vector field;

motion compensated prediction means for predicting a predicted video data frame based on said reference frame $R_{ref}$ and said compressed motion information;

computing means having an input for receiving said first video data frame and said predicted video data frame, said computing means being arranged to calculate a prediction error frame based on said predicted video data frame and on said first video data frame;

prediction error encoding means for encoding said prediction error frame;

means for transmitting said first motion coefficients and said prediction error frame to a decoder;

is characterised by said motion encoding means further comprising:

means, for calculating and storing for each segment a distortion matrix E and a distortion vector y such that a predefined measure $\Delta E$ for distortion in each segment, due to approximating said motion vector field as coefficients $c_i$ of a set of polynomial basis functions $f_i$, is a function of (E c−y), c being a vector of said motion coefficients $c_i$;

means for decomposing said distortion matrix E into a first matrix Q and a second matrix R such that
det Q≠0, and
Q R=E,
a subset of the set of all columns of matrix Q being a basis of a vector space defined by all possible linear combinations of all column vectors of matrix E, columns of matrix Q being orthogonal to each other;

means for calculating an auxiliary vector z according to $z=Q^{-1} y$, $Q^{-1}$ being the inverse matrix of said first matrix Q;

means for generating for each segment a column extended matrix A comprising the columns of matrix R and vector z as an additional column, and for selecting all rows of matrix A which have elements unequal to zero in all columns due to matrix R;

means for merging segments based on selective combination of segments producing an increase in said prediction error within a certain limit;

means for generating a row extended matrix B comprising said selected rows of matrix A of said first segment $S_i$ and said selected rows of matrix A of said second segment $S_j$;

means for performing a series of multiplications of rows of matrix B with scalars unequal to zero and additions of rows of matrix B in order to obtain a modified matrix B' having in the columns due to matrix R as many rows as possible filled with zeros;

orthogonalising means receiving one of said matrices A, B and B' as an input matrix M, said orthogonalising means being arranged to replace said polynomial basis functions with $f_i$ by orthogonal basis functions $\tilde{f}_i$ and to modify said input matrix to a third matrix $\tilde{M}$ coressponding to said orthogonal basis functions;

removing means having an input for receiving of said third matrix $\tilde{M}$, said removing means being arranged to modify said third matrix by removing from said third matrix the ith column due to R corresponding to the $i^{th}$ basis functions of said basis functions, and said removing means have an output to provide a matrix $\hat{M}$;

means for computing second motion coefficients $\tilde{c}$ using said fourth matrix $\hat{M}$; and quantisation means, having an input for receiving said second motion coefficients $\tilde{c}$, said quantisation means being arranged to quantise said second motion coefficients $\tilde{c}$.

A Method of motion compensated encoding of video data, according to a first aspect of the invention, comprising the steps:

a) receiving a first video data frame $I_n$ and a reference frame, estimating a motion vector field $(\Delta X, \Delta Y)$ describing scene motion displacements of video frame pixels, and outputting said first video frame, said motion vector field and a reference frame $R_{ref}$;

b) receiving said first estimated motion vector field; partitioning of a video frame into at least two segments said segments being a first segment $S_i$ and a second segment $S_j$; said first video data frame and said reference frame $R_{ref}$, for obtaining compressed motion information comprising first motion coefficients representing said motion vector field;

c) predicting a predicted video data frame based on said reference frame $R_{ref}$ and said compressed motion information;

d) receiving said first video data frame to calculate a prediction error frame based on said predicted video data frame and on said first video data frame;

e) encoding said prediction error frame;

f) transmitting said first motion coefficients and said prediction error frame to a decoder; is characterised by said method further comprising the steps:

g) calculating and storing for each segment a distortion matrix E and a distortion vector y such that a predefined measure ΔE for distortion in each segment, due to approximating said motion vector field as coefficients $c_i$ of a set of polynomial basis functions $f_i$, is a function of (E c−y), c being a vector of said motion coefficients $c_i$;

h) decomposing said distortion matrix E into a first matrix Q and a second matrix R such that
det Q≠0 and
Q R=E,
a subset of the set of all columns of matrix Q being a basis of a vector space defined by all possible linear combinations of all column vectors of matrix E, columns of matrix Q being orthogonal to each other;

i) calculating an auxiliary vector z according to
z=$Q^{-1}$ y , $Q^{-1}$ being the inverse matrix of said first matrix Q;

j) generating for each segment a column extended matrix A comprising the columns of matrix R and vector z as an additional column, and for selecting all rows of matrix A which have elements unequal to zero in all columns due to R;

k) merging segments based on selective combination of segments producing an increase in said prediction error within a certain limit;

l) generating a row extended matrix B comprising said selected rows of matrix A of said first segment $S_i$ and said selected rows of matrix A of said second segment $S_j$;

m) performing a series of multiplications of rows of matrix B with scalars unequal to zero and additions of rows of matrix B in order to obtain a modified matrix B' having in the columns due to matrix R as many rows as possible filled with zeros;

o) receiving one of said matrices A, B and B' as an input matrix M to replace said polynomial basis functions with $f_i$ by orthogonal basis functions $\tilde{f}_i$ and to calculate second motion coefficients $\tilde{c}$ using said orthogonal basis functions and said input matrix M; and q) receiving said and quantising second motion coefficients $\tilde{c}$.

A method of motion compensated encoding of video data, according to a second aspect of the invention, comprising the steps:

a) receiving a first video data frame $I_n$ and a reference frame, estimating a motion vector field (ΔX, ΔY) describing scene motion displacements of video frame pixels, and outputting said first video frame, said motion vector field and a reference frame $R_{ref}$;

b) receiving said first estimated motion vector field; partitioning of a video frame into at least two segments said segments being a first segment $S_i$ and a second segment $S_j$; said first video data frame and said reference frame $R_{ref}$, for obtaining compressed motion information comprising first motion coefficients representing said motion vector field;

c) predicting a predicted video data frame based on said reference frame $R_{ref}$ and said compressed motion information;

d) receiving said first video data frame to calculate a prediction error frame based on said predicted video data frame and on said first video data frame;

e) encoding said prediction error frame;

f) transmitting said first motion coefficients and said prediction error frame to a decoder;

is characterised by said method further comprising the steps:

g) calculating and storing for each segment a distortion matrix E and a distortion vector y such that a predefined measure ΔE for distortion in each segment, due to approximating said motion vector field as coefficients $c_i$ of a set of polynomial basis functions $f_i$, is a function of (E c−y), c being a vector of said motion coefficients $c_i$;

h) decomposing said distortion matrix E into a first matrix Q and a second matrix R such that
det Q≠0 and
Q R=E,
a subset of the set of all columns of matrix Q being a basis of a vector space defined by all possible linear combinations of all column vectors of matrix E, columns of matrix Q being orthogonal to each other;

i) calculating an auxiliary vector z according to
z=$Q^{-1}$ y , $Q^{-1}$ being the inverse matrix of said first matrix Q;

j) generating for each segment a column extended matrix A comprising the columns of matrix R and vector z as an additional column, and for selecting all rows of matrix A which have elements unequal to zero in all columns due to matrix R;

k) merging segments based on selective combination of segments producing an increase in said prediction error within a certain limit;

l) generating a row extended matrix B comprising said selected rows of matrix A of said first segment $S_i$ and said selected rows of matrix A of said second segment $S_j$;

m) performing a series of multiplications of rows of matrix B with scalars unequal to zero and additions of rows of matrix B in order to obtain a modified matrix B' having in the columns due to matrix R as many rows as possible filled with zeros;

n) receiving one of said matrices A, B and B' as an input matrix M, said orthogonalising means being arranged to replace said polynomial basis functions with $f_i$ by orthogonal basis functions $\tilde{f}_i$ and to modify said input matrix to a third matrix $\tilde{M}$ coressponding to said orthogonal basis functions;

o) receiving said third matrix $\tilde{M}$ to modify said third matrix $\tilde{M}$ to a fourth matrix $\hat{M}$ by removing from said third matrix $\tilde{M}$ the $i^{th}$ column due to matrix R corresponding to the $i^{th}$ basis functions of said basis functions, and outputting said fourth matrix $\hat{M}$;

p) computing second motion coefficients $\tilde{c}$ using said fourth matrix $\hat{M}$; and q) receiving said second motion coefficients $\tilde{c}$ and quantising said second motion coefficients $\tilde{c}$.

A video decoder for decoding of motion compensation encoded video data, according to the invention, is characterised by said decoder comprising:

means for storing a video data frame;

means for predicting a video data frame based on said stored video data frame and on received motion information;

means for decoding received prediction error data and obtaining a prediction error frame; and means for calculating and outputting an updated video data frame based on said predicted video data frame and said decoded prediction error frame, and storing the updated video data frame in said storing means; said means for predicting a video data frame comprising:

means for demultiplexing received motion data into at least two of the following: data concerning the partitioning of said updated video data frame into segments $S_i$, data concerning a selection of basis functions from a set of motion field model basis functions, and data concerning coefficients of selected basis functions;

means for reconstructing said motion vector field in each segment $S_i$ from a linear combination of said selected basis functions and coefficients; and means for calculating said prediction frame based on said reconstructed motion vector field and based on said stored video data frame.

A system for handling video data, comprising an encoder for performing motion compensated encoding of video data and a decoder for decoding said motion compensated encoding of video data, according to a first aspect of the invention, is characterised by said encoder comprising:

motion field estimating means, having an input for receiving a first video data frame $I_n$ and a reference frame $R_{ref}$, said motion field estimating means being arranged to estimate a motion vector field ($\Delta X$, $\Delta Y$) describing scene motion displacements of video frame pixels, and having an output for outputting said first video frame, said motion vector field and said reference frame $R_{ref}$;

motion field encoding means having an input to receive from said motion field estimating means said first estimated motion vector field; partitioning of a video frame into at least two segments said segments being a first segment $S_i$ and a second segment $S_j$; said first video data frame and said reference frame $R_{ref}$, said motion field encoding means being arranged to obtain compressed motion information comprising first motion coefficients representing said motion vector field;

motion compensated prediction means for predicting a predicted video data frame based on said reference frame $R_{ref}$ and said compressed motion information;

computing means having an input for receiving said first video data frame and said predicted video data frame, said computing means being arranged to calculate a prediction error frame based on said predicted video data frame and on said first video data frame;

prediction error encoding means for encoding said prediction error frame;

means for transmitting said first motion coefficients and said prediction error frame to a decoder;

said motion encoding means further comprising:

means, for calculating and storing for each segment a distortion matrix E and a distortion vector y such that a predefined measure $\Delta E$ for distortion in each segment, due to approximating said motion vector field as coefficients $c_i$ of a set of polynomial basis functions $f_i$, is a function of (E c−y), c being a vector of said motion coefficients $c_i$;

means for decomposing said distortion matrix E into a first matrix Q and a second matrix R such that
det Q≠0 and
Q R=E,
a subset of the set of all columns of matrix Q being a basis of a vector space defined by all possible linear combinations of all column vectors of matrix E, columns of matrix Q being orthogonal to each other;

means for calculating an auxiliary vector z according to $z=Q^{-1}$ y, $Q^{-1}$ being the inverse matrix of said first matrix Q;

means for generating for each segment a column extended matrix A comprising the columns of matrix R and vector z as an additional column, and for selecting all rows of matrix A which have elements unequal to zero in all columns due to R;

means for merging segments based on selective combination of segments producing an increase in said prediction error within a certain limit;

means for generating a row extended matrix B comprising said selected rows of matrix A of said first segment $S_i$ and said selected rows of matrix A of said second segment $S_j$;

means for performing a series of multiplications of rows of matrix B with scalars unequal to zero and additions of rows of matrix B in order to obtain a modified matrix B' having in the columns due to matrix R as many rows as possible filled with zeros;

orthogonalising means receiving one of said matrices A, B and B' as an input matrix M, said orthogonalising means being arranged to replace said polynomial basis functions with $f_i$ by orthogonal basis functions $\tilde{f}_i$ and to calculate second motion coefficients $\tilde{c}$ using said orthogonal basis functions and said input matrix M; and quantisation means, having an input for receiving said second motion coefficients $\tilde{c}$, said quantisation means being arranged to quantise said second coefficients $\tilde{c}$; and said decoder comprising:

means for storing a video data frame;

means for predicting a video data frame based on said stored video data frame and on received motion information;

means for decoding received prediction error data and obtaining a prediction error frame; and means for calculating and outputting an updated video data frame based on said predicted video data frame and said decoded prediction error frame, and storing the updated video data frame in said storing means; said means for predicting a video data frame further comprising:

means for demultiplexing received motion data into at least two of the following: data concerning the partitioning of said updated video data frame into segments $S_i$, data concerning a selection of basis functions from a set of motion field model basis functions, and data concerning coefficients of selected basis functions;

means for reconstructing said motion vector field in each segment $S_i$ from a linear combination of said selected basis functions and coefficients; and means for calculating said prediction frame based on said reconstructed motion vector field and based on said stored video data frame.

A system for handling video data, comprising an encoder for performing motion compensated encoding of video data and a decoder for decoding said motion compensated encoding of video data, according to a second aspect of the invention, is characterised by said encoder comprising:

motion field estimating means, having an input for receiving a first video data frame $I_n$ and a reference frame $R_{ref}$, said motion field estimating means being arranged to estimate a motion vector field ($\Delta X$, $\Delta Y$) describing scene motion displacements of video frame pixels and having an output to output said first video frame, said motion vector field and said reference frame $R_{ref}$;

motion field encoding means having an input to receive from said motion field estimating means said first estimated motion vector field; partitioning of a video frame into at least two segments said segments being a first segment $S_i$ and a second segment $S_j$; said first video data frame and said reference frame $R_{ref}$, said motion field encoding means being arranged to obtain compressed motion information comprising first motion coefficients representing said motion vector field;

motion compensated prediction means for predicting a predicted video data frame based on said reference frame $R_{ref}$ and said compressed motion information;

computing means having an input for receiving said first video data frame and said predicted video data frame, said computing means being arranged to calculate a prediction error frame based on said predicted video data frame and on said first video data frame;

prediction error encoding means for encoding said prediction error frame;

means for transmitting said first motion coefficients and said prediction error frame to a decoder; said motion encoding means further comprising:

means, for calculating and storing for each segment a distortion matrix E and a distortion vector y such that a predefined measure $\Delta E$ for distortion in each segment, due to approximating said motion vector field as coefficients $c_i$ of a set of polynomial basis functions $f_i$, is a function of (E c−y), c being a vector of said motion coefficients $c_i$;

means for decomposing said distortion matrix E into a first matrix Q and a second matrix R such that det Q≠0, and
Q R=E,
a subset of the set of all columns of matrix Q being a basis of a vector space defined by all possible linear combinations of all column vectors of matrix E, columns of matrix Q being orthogonal to each other;

means for calculating an auxiliary vector z according to $z=Q^{-1} y$, $Q^{-1}$ being the inverse matrix of said first matrix Q;

means for generating for each segment a column extended matrix A comprising the columns of matrix R and vector z as an additional column, and for selecting all rows of matrix A which have elements unequal to zero in all columns due to matrix R;

means for merging segments based on selective combination of segments producing an increase in said prediction error within a certain limit;

means for generating a row extended matrix B comprising said selected rows of matrix A of said first segment $S_i$ and said selected rows of matrix A of said second segment $S_j$;

means for performing a series of multiplications of rows of matrix B with scalars unequal to zero and additions of rows of matrix B in order to obtain a modified matrix B' having in the columns due to matrix R as many rows as possible filled with zeros;

orthogonalising means receiving one of said matrices A, B and B' as an input matrix M, said orthogonalising means being arranged to replace said polynomial basis functions with $f_i$ by orthogonal basis functions $\tilde{f}_i$ and to modify said input matrix to a third matrix $\tilde{M}$ coressponding to said orthogonal basis functions;

removing means having an input for receiving of said third matrix $\tilde{M}$, said removing means being arranged: to modify said third matrix by removing from said third matrix the $i^{th}$ column due to R corresponding to the $i^{th}$ basis functions of said basis functions, and said removing means have an output to provide a matrix $\hat{M}$;

means for computing second motion coefficients $\tilde{c}$ using said fourth matrix $\hat{M}$; and quantisation means, having an input for receiving said second motion coefficients $\tilde{c}$, said quantisation means being arranged to quantise said second motion coefficients $\tilde{c}$ and to output said second motion coefficients after quantisation; and said decoder comprising:

means for storing a video data frame;

means for predicting a video data frame based on said stored video data frame and on received motion information;

means for decoding received prediction error data and obtaining a prediction error frame; and means for calculating and outputting an updated video data frame based on said predicted video data frame and said decoded prediction error frame, and storing the updated video data frame in said storing means; said means for predicting a video data frame comprising:

means for demultiplexing received motion data into at least two of the following: data concerning the partitioning of said updated video data frame into segments $S_i$, data concerning a selection of basis functions from a set of motion field model basis functions, and data concerning coefficients of selected basis functions;

means for reconstructing said motion vector field in each segment $S_i$ from a linear combination of said selected basis functions and coefficients; and means for calculating said prediction frame based on said reconstructed motion vector field and based on said stored video data frame.

The embodiments of the invention are defined in the dependent claims.

In accordance with a first embodiment of the invention the encoder can perform merging of segments and find for a merged segment, in a computationally efficient way, a set of motion coefficients minimising a measure of distortion. This aspect of the invention also allows a simple and efficient evaluation of distortion due to segment merging, if desired. Advantageously, the encoder according to this aspect performs adaptive merging of adjacent segments of a video frame by means of calculating an additional distortion according to a predefined measure and merging the segments if the additional distortion is tolerable, e.g. below a given threshold or tolerable with regard to an achieved bit rate reduction. A chosen measure for calculating this distortion can be, but is not limited to, some measure of prediction error, for instance the energy or squared prediction error in the segment. Another measure of distortion can be e.g. the squared difference between an original frame and the restored original frame after encoding and decoding. For this purpose the motion field encoder included in the video encoder comprises three main blocks.

The first main block may be called a QR motion analyser. Its task is to find a new representation of the inputted motion vector field produced by the motion field estimator. This new representation is applied to the second main block. Operations in this first main block include a plurality of steps comprising matrix operations: In the first step the prediction frame is linearised using some known approximation method so that the prediction frame becomes a linear function of the motion vectors. In the second step a matrix $E_i$ and a matrix $y_i$ are constructed for minimisation of an appropriate measure of prediction error, e.g. the square prediction error. Matrix $E_i$ is decomposed into a product of two matrices $Q_i$ and $R_i$. In addition, an auxiliary vector $z_i$ is calculated from the factor matrix $Q_i$ and the matrix $y_i$. Part of the matrix $R_i$ and the auxiliary vector $z_i$ are applied to the second main block.

The second main block, called a segment merging block, performs merging operations for pairs of segments $S_i$, $S_j$. Advantageously, this block checks whether the motion in the combined area of $S_i$ and $S_j$ can be predicted using a common motion field model for the combined area. In the merging operations a matrix equation is firstly formed based on said factor matrices, thereafter the factor matrices are processed by using known matrix computation methods. The result is a matrix equation which allows calculation of motion coefficients common for the pair of segments under consideration, in a simple and efficient way. Using these coefficients the chosen measure of distortion can be calculated in the area of the merged segments. If the square prediction error is used as the measure of distortion, it can be easily calculated on the basis of the terms included in one of the resulting matrices. If the change of said measure of prediction error is acceptable according to a chosen criterion, the segments are merged. It will be appreciated that no merging occurs if merging of segments would cause excessive distortion to the prediction.

After all pairs of segments are considered the output of the segment merging block is a new segmentation of the image with a reduced number of segments. Moreover, for each new segment the block outputs a matrix $R_k^1$ and a vector $z_k^1$, which allow calculation of all motion coefficients in a simple and efficient way. Also, the encoder provides the decoder with information enabling the reconstruction of the resulting new segments in the frame.

The segment merging block according to this aspect of the invention allows a computationally simple judgement whether segments can be merged into one. Merging of as many segments as possible can be achieved by judging for each pair of adjacent segments whether merging is possible, and repeating this process for the resulting segmentation of the frame until no pair of adjacent segments suitable for merging remains in the frame.

According to an embodiment of the invention the amount of distortion introduced by the segment merging can be calculated based on a linear approximation of additional distortion due to approximating the motion vector field by a linear combination of basis functions.

The third main block is called an orthogonalisation block. This block receives as its input the partitioning of the current frame into segments and for every segment $S_k$ matrices $R_k^1$ and $Z_k^1$ from the segment merging block.

The block replaces the polynomial basis functions which describe the motion vectors of the image segments by orthogonal polynomials. Orthogonalisation leads to a motion field model which is less sensitive to quantisation errors resulting from quantising the motion coefficients and to representation of the motion vector field with fewer bits.

Additionally, an encoder according to a second aspect of the present invention includes a fourth main block, which allows removing coefficients from the set of coefficients representing the motion vector field of a segment and finding, in a computationally efficient way, the optimum remaining coefficients having regard to a measure of distortion. Also, if desired, the invention according to this aspect enables checking whether the omission of a particular coefficient of this set causes a significant increase of distortion in the motion field or not. This check is performed in a computationally efficient way such that for each segment each coefficient of the set may be subjected to such checking. It is only necessary to transmit those coefficients to the decoder that are found to increase the distortion significantly if omitted.

An encoder according to a third aspect of the invention comprises a first main block operating in a similar way to the first main block of the first aspect of the invention. It furthermore comprises a second main block equivalent to the fourth main block of the second aspect. The second main block receives for every segment $S_i$ a matrix $R_i$ and a vector $z_i$ produced by the first block. If desired, the second main block determines based on matrix $R_i$ and vector $z_i$ for each of the segments whether it is possible to simplify the motion field model by removing basis functions from the model without intolerable increase of distortion.

The operations in the fourth main block of the third aspect of the invention are matrix operations, in which the matrix equation is firstly modified by removing one column and row of the matrix equation $R_i c = z_i$, c being a vector comprising the coefficients $c_i$ of the model. Removal of one column and row corresponds to removal of one basis function from the motion model. Then the matrix equation is triangularised. Motion coefficients corresponding to the reduced set of basis functions can be calculated by solving the resulting linear equation. The equation can be solved using back substitution or some other well known algorithm. If the prediction error is used as a measure of distortion, its change for the segment caused by removal of a basis function is a simple predetermined function of one term in the resulting equation.

For each segment more coefficients can be removed by repeating these matrix operations. Using such an approach one can easily find the distortion when using different reduced sets of basis functions. The set which yields the desired level of distortion is selected to represent the motion of the segment.

For every segment processed, the coefficient removal block outputs segment selection information which tells which basis functions were removed from the motion field model. Additionally, it outputs new motion coefficients corresponding to the remaining basis functions. Both selection information and motion coefficients are transmitted to the decoder.

The removal of a basis function from a set of basis functions is fully equivalent to setting the value of a coefficient corresponding to the removed basis function to zero. Thus, an alternative implementation the encoder, may instead of outputting the selection information followed by motion coefficients, output all motion coefficients with coefficients corresponding to removed basis functions having values equal to zero.

Preferably, a motion compensated video encoder takes advantage of adaptively merging segments, orthogonalising the output of segment merging and removing motion coefficients which are not significant for the overall distortion. Such a preferred encoder includes all four blocks previously described, namely a QR motion analyser, a segment merging block and an orthogonalisation block according to the first aspect of the invention and also a coefficient removal block according to the second aspect of the invention. The orthogonalisation block receives the current partitioning of segments and for every segment $S_k$ it also receives matrices $R_k^1$ and $Z_k^1$ from the segment merging block and orthogonalises the motion field model with respect to the segments obtained from segment merging. The coefficient removal block then receives for every segment $S_k$ matrices $\tilde{R}_k^1$ and $\tilde{Z}_k^1$ produced by the orthogonalisation block. Only after merging of adjacent segments and after manipulating matrix $R^1$ and vector $z^1$ for coefficient removal, the coefficients $c_i$ of each segment are calculated for transmission, resulting in a substantial reduction in the amount of motion data output by the video encoder.

Preferably, a video encoder and decoder according to the present invention is implemented in hardware, e.g. as one or more integrated circuits, adapted to perform encoding and compressing of received video frames, and decoding encoded video data, respectively, according to the present invention.

It is common in the video coding art that different areas of the video frame are coded using different coding modes. This variability of coding modes also includes the motion compensated prediction method used in the codecs. Several modes are used in all modern video codecs such as the ITU H.261 and H.263 as well as the ISO MPEG-1 and MPEG-2 video coding standards.

For example, some of the video frame areas are coded without using any temporal prediction at all (so called intra-blocks). No motion coefficients are transmitted for such image areas and the areas are coded without reference to any prior images. Practical embodiments of the present invention would also combine the invention with such intra-coding.

Furthermore, in typical video image sequences, large areas of the video frame remain stationary for the duration of several frames (i.e., there is no motion). It is computationally much easier to detect that an area has remained stationary than to estimate the motion of the video frame area. Therefore, practical video codecs often check the area to detect whether there is any motion at all and include a stationary prediction mode where no motion parameters need to be transmitted. Practical embodiments of the present invention would also combine the invention with such a stationary mode. The MPEG video coding standards also include coding modes where the motion estimation is performed with respect to two reference frames (bi-directional prediction). This results in two different predictions for the area to be coded. The encoder may decide to use the better of these predictions, or it may decide to combine the two predictions (e.g., by averaging). The decision regarding the mode needs to be communicated to the decoder. The ITU H.263 standard also includes a temporal prediction mode using two reference frames. It is clear that the present invention can benefit from similar techniques of using multiple reference frames.

It is thus clear for those skilled in the art that the present invention can be the basis for one or more coding modes in a video codec where it is used together with prior art coding modes (such as intra coding, stationary modes, or multiple reference frames).

A preferred embodiment of the present invention will now be described with reference to the accompanying drawings.

DETAILED DESCRIPTION

Figure 1:
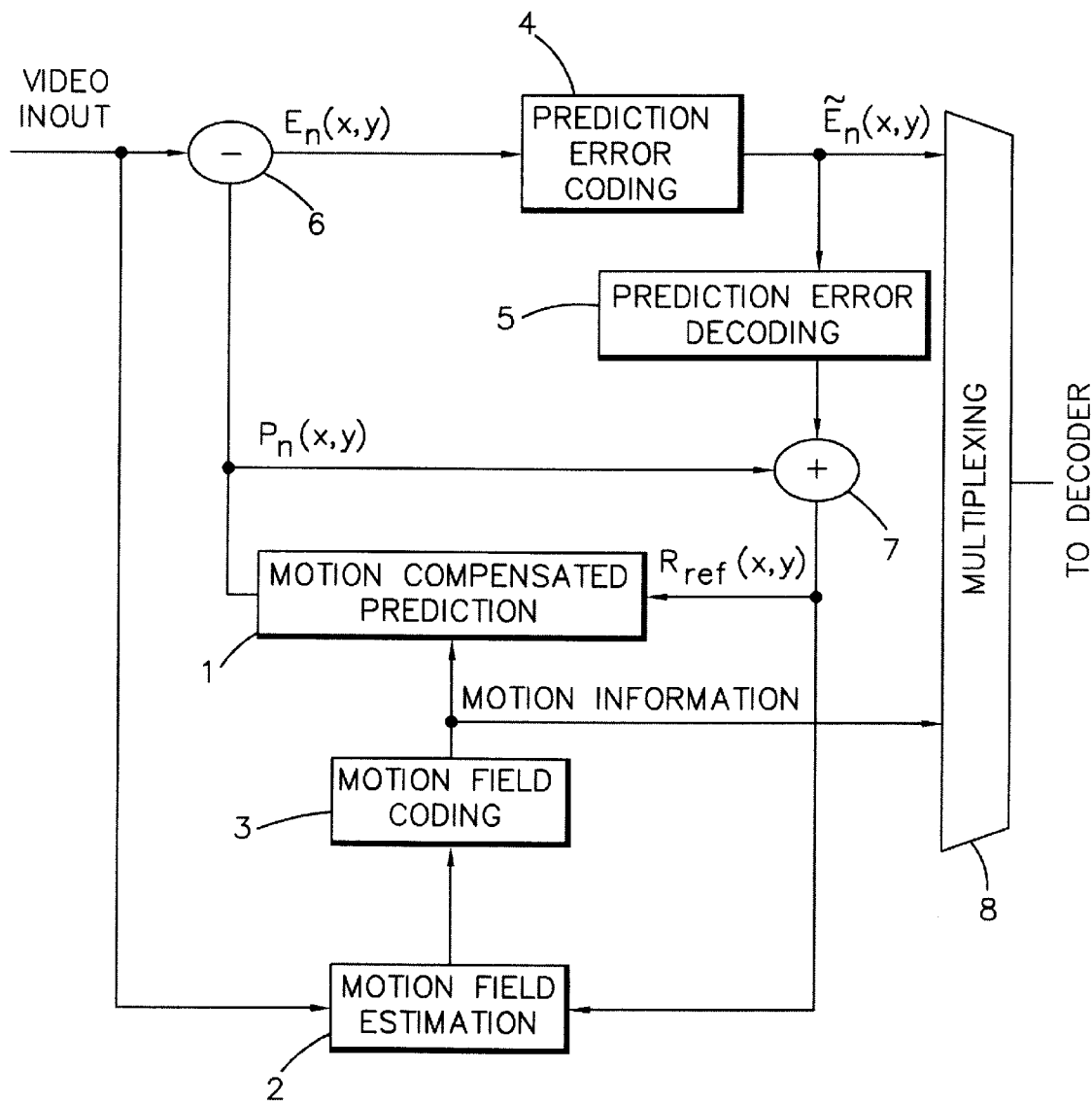
FIG. 1 is a schematic diagram of a known encoder.

The output of the video encoder shown in FIG. 1 is the compressed frame divided into segments $S_i$ and each of the segments $S_i$ is accompanied by information regarding motion vectors $[\Delta x(x,y), \Delta y(x,y)]$ for each pixel $(x,y)$ of the respective segment. Then for a segment $S_i$ which consists of P pixels with coordinates $(x_i,y_i)$, i=1,2, ..., P, the task of the motion field encoder 3 is to find motion coefficients from the motion vector field $(\Delta x(x_i,y_i), \Delta y(x_i,y_i))$ output by the motion field estimation block 2. The motion coefficients, denoted by $c=(c_1, c_2, \ldots, c_{N+M})$ represent a compressed motion vector field $[\Delta \tilde{x}(\cdot), \Delta \tilde{y}(\cdot)]$ which approximates $[\Delta x(x,y), \Delta y(x,y)]$ as precisely as necessary using a linear motion model of the form:

$$\tilde{\Delta}x(x, y) = \sum_{i=1}^{N} c_i f_i(x, y) \tag{4a}$$

$$\tilde{\Delta}y(x, y) = \sum_{i=N+1}^{N+M} c_i f_i(x, y) \tag{4b}$$

such that the square prediction error SPE is minimised, SPE being given by:

$$SPE = \sum_{i=1}^{P} \left( I_n(x_i, y_i) - R_{ref}(x_i + \tilde{\Delta}x(x_i, y_i), y_i + \tilde{\Delta}y(x_i, y_i)) \right)^2 \tag{5}$$

Figure 5:
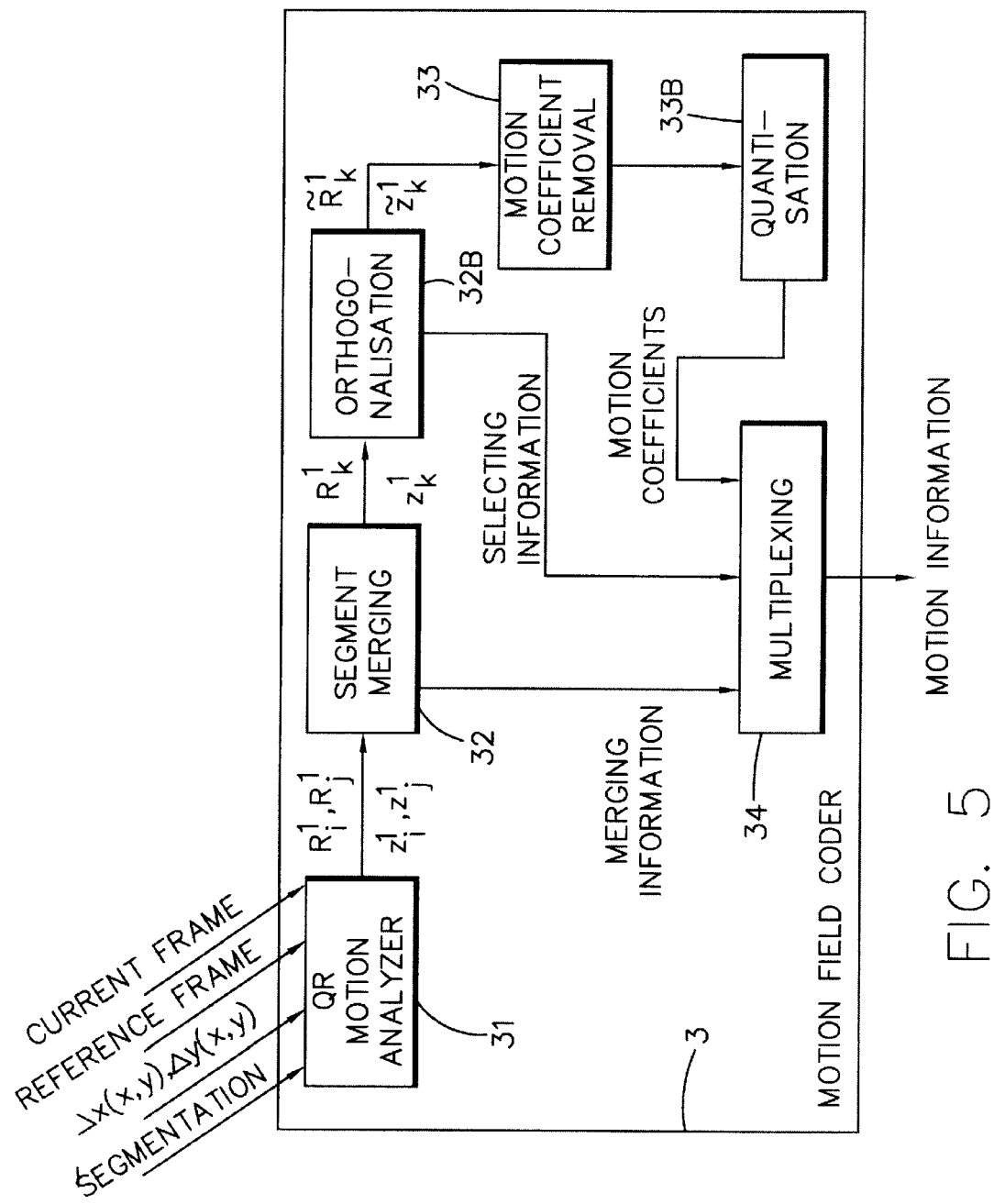
FIG. 5 is a motion field coder according to the preferred embodiment of the present invention.

FIG. 5 illustrates an embodiment of a motion field encoder in a video encoder according to the invention. It corresponds to block 3 in FIG. 1 but its inputs also include the reference frame and the current frame. The third input to this block is the motion vector field $[\Delta x(\cdot), \Delta y(\cdot)]$ produced by motion field estimation block 2, FIG. 1.

To fulfill said task, the motion field encoder 3 consists of four main building blocks which are the QR motion analyser block 31, the segment merging block 32, orthogonalisation block 32b and motion coefficient removal block 33. The segment merging block 32, orthogonalisation block 32b and the motion coefficient removal block 33 reduce the amount of motion information which may result in a less accurate prediction and hence an increase of the square prediction error.

Figure 6:
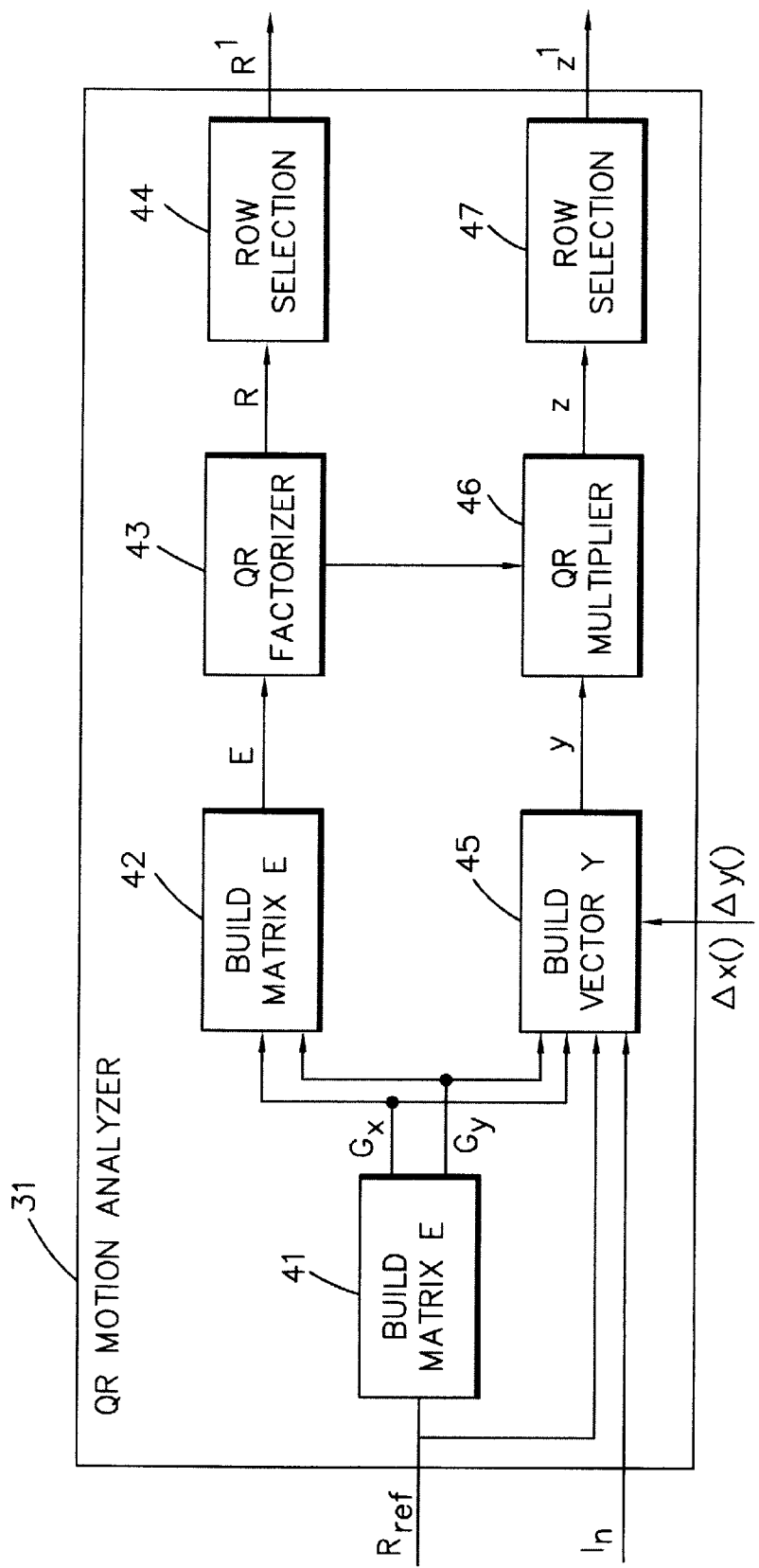
FIG. 6 is a schematic diagram of a QR motion analyser.

The objective of the QR motion analyser is to find a new representation of the motion field that is suitable for judging efficiently the impact of segment merging, orthogonalisation and coefficient removal on the prediction error. This new representation is used later in the other three blocks for fast and flexible determination of motion coefficients for merged segments and for coefficient removal. FIG. 6 shows an embodiment of the QR motion analyser according to this invention. This block comprises a gradient filter 41 receiving a reference video frame input $R_{ref}$. The outputs $G_x$, $G_y$ of the gradient filter are input into a block 42 for building a matrix E and into a block 45 for building a vector y. Matrix building block 42 performs a linearisation of the reference frame $R_{ref}$ such that the approximated reference frame is a linear function of $\Delta x$ and $\Delta y$ and calculates on the basis of this linearisation a matrix E, the multiplication of which with a vector c of coefficients $c_i$ in equations 4a, 4b above may be interpreted as prediction error resulting if $\Delta x$, $\Delta y$ are replaced by a linear combination of basis functions $f_i(x,y)$ of a linear motion model.

Block 45 for building vector y receives the current frame $I_n$, reference frame $R_{ref}$, the outputs $G_x$, $G_y$ of the gradient filter 41 and the motion vectors $[\Delta x(x,y), \Delta y(x,y)]$ estimated by block 2 in FIG. 1 and calculates said vector y from these inputs.

Matrix E and vector y are received by a QR factoriser block 43 and a matrix multiplier block 46, respectively. The function of these blocks can be regarded as a coordinate transformation of matrix E and vector y in order to prepare for finding coefficients $c_i$ such that for all pixels of a given segment the prediction error resulting from the representation of $\Delta x$, $\Delta y$ as a linear combination of basis functions $f_i$ is as close as possible to the inherent prediction error. This will be explained in further detail below.

Block 43 outputs a matrix R which results from representing matrix E in the coordinates of a matrix Q also output by block 43. Block 46 receives not only said vector y but also said matrix Q from block 43 and finds a vector z representing y in the coordinates of matrix Q. Preferably matrix Q is orthonormal. As will be shown in further detail below this representation of E and y as R and z, respectively, is very advantageous for judging whether adjacent segments can be merged with tolerable increase of prediction error, and also for finding the minimum number of coefficients necessary for representing the motion vector field of a merged or non-merged segment, i.e. for removing non-significant coefficients from the set of coefficients $c_i$ in equations 4a, 4b.

Blocks 44 and 47 receive matrix R and vector z, respectively and select rows from these which are required for judging the effect of segment merging and/or motion coefficient removal. These operations are performed based on R and z without the need of calculating said coefficients $c_i$. Furthermore, all row manipulations refer both to the rows of R and to the corresponding rows of z such that R and z can be regarded for the purpose of segment merging and/or motion coefficient removal as a single column extended matrix A comprising the columns of R and comprising as an additional column, vector z. Accordingly, blocks 44 and 47 can be regarded and implemented as one block for manipulating matrix A by selecting appropriate rows of A and for outputting a modified matrix A' comprising the selected rows of A. A' comprises the selected rows denoted $R^1$ of R and the selected rows denoted $z^1$ of z.

Segment merging block 32 receives $R^1$ and $z^1$, i.e. matrix A', for each segment and judges whether merging of two segments $S_i$, $S_j$ by means of representing the motion vector fields of both segments with the same set of coefficients, results in a tolerable increase of prediction error. This is done by means of generating a row extended matrix B comprising all rows of matrix $A'_i$ of segment $S_i$ and of matrix $A'_j$ of segment $S_j$. Segments $S_i$, $S_j$ can be, but do not have to be, adjacent. Matrix B is subjected to a further coordinate transformation e.g. by means of triangularisation of matrix B, resulting in a modified matrix B'. Block 32 in FIG. 5 judges whether segment merging is possible, from selected elements in matrix B' in that column which results from vectors $z_i^1$ and $z_j^1$ and in rows which have zeros in the columns of B' resulting from matrices $R_i^1$ and $R_j^1$. Preferably, said further coordinate transformation is orthonormal. Then the additional prediction error resulting from merging is the sum of the square of said selected elements.

Orthogonalisation block 32b receives for each segment after frame resegmentation said matrix A' if the corresponding segment remained unmerged, or matrix B' for merged segments and merging information from segment merging block 32. Block 32b then modifies matrices A' or B' by replacing the polynomial basis functions which represent the motion vectors of such a segment with orthogonal polynomials. The modified matrices together with the segmentation information, are output to block 33. The modified matrices are denoted by $\tilde{A}^1$ and $\tilde{B}^1$, respectively, depending on whether they originate from unmerged or merged segments.

For each segment the motion coefficient removal block 33 in FIG. 5 receives said matrix $\tilde{A}^1$ if the corresponding segment remained unmerged, or matrix $\tilde{B}^1$ for merged segments and judges whether removal of coefficients $c_i$ is possible with a tolerable increase of prediction error. This is performed by block 33 by means of extracting a row from matrix $\tilde{A}^1$ or $\tilde{B}^1$, respectively, i.e. the row corresponding to coefficient $c_i$. The additional prediction error introduced due to removing a coefficient can then be calculated from a selected element of said transformed matrix, said selected element being located in the column resulting from $z^1$ of said transformed matrix and in the row of this matrix which has zeros in all columns resulting from $R^1$.

Multiplexer 34 in FIG. 5 receives merging information from block 32, information about which coefficients $c_i$ are selected for transmission, and the selected coefficients $c_i$ which are finally calculated based on said transformed matrix produced by block 33. The information transmitted by multiplexer 34 is then output to the video decoder (not shown).

In more detail the operation of qr motion analyser consists of following steps:

Step 1 is linearisation of the prediction error. In this step the reference frame $R_{ref}$ in equation (5) is approximated using some known approximation method so that it becomes linear with respect to $[\Delta x(\cdot), \Delta y(\cdot)]$. Then the elements under the sum in formula (5) become linear combinations of coefficients $c_i$ $$SPE = \sum_{j=1}^{P} (e_{j,1} c_1 + e_{j,2} c_2 + \ldots + e_{j,N+M} c_{N+M} - y_j)^2 \tag{6}$$

In the preferred implementation a quadratic polynomial motion vector field model with 12 coefficients is used:

$$\Delta x(x,y) = c_1 + c_2 x + c_3 y + c_4 xy + c_5 x^2 + c_6 y^2 \quad (7a)$$

$$\Delta y(x,y) = c_7 + c_8 x + c_9 y + c_{10} xy + c_{11} x^2 + c_{12} y^2 \quad (7b)$$

In practice this model can handle even very complex motion in video sequences very well and yields good prediction results.

In the QR motion analyser block, linearisation in step 1 is done by using Taylor expansion of $R_{ref}$ at every pixel $(x_i, y_i)$ where $i = 1, 2, \ldots P$, around points:

$$x'_i = x_i + \tilde{A}x(x_i, y_i)$$

$$y'_i = y_i + \tilde{A}y(x_i, y_i)$$

Using the property that $\Sigma a^2 = \Sigma(-a)^2$, the square prediction error SPE is then $$SPE = \sum_{i=1}^{P} (R_{ref}(x'_i, y'_i) + (\tilde{\Delta}x(x_i, y_i) - \Delta x(x_i, y_i))G_x(x'_i, y'_i) + $$

$$(\tilde{\Delta}y(x_i, y_i) - \Delta y(x_i, y_i))G_y(x'_i, y'_i) - I_n(x_i, y_i)^2)$$

Auxiliary values $g_j(x,y)$ are calculated using formula:

$$g_j(x_i, y_i) = \begin{cases} f_j(x_i, y_i) G_x(x'_i, y'_i) & \text{when } j = 1, 2, \ldots, N \\ f_j(x_i, y_i) G_y(x'_i, y'_i) & \text{when } j = N+1, N+2, \ldots, N+M \end{cases}$$

where function $f_j(x_i, y_i)$ is a predefined basis function according to the motion field model as defined in equations (4a) and (4b) and more specifically, in equations (7a) and (7b).

Step 2 is construction of matrices. It is based on the fact that minimisation of the SPE according to formula (6) is fully equivalent to minimisation of the matrix expression $(Ec-y)^T(Ec-y)$, where E and y are:

$$E = \begin{bmatrix} e_{1,1} & e_{1,2} & \cdots & e_{1,N+M} \\ e_{2,1} & e_{2,2} & \cdots & e_{2,N+M} \\ \vdots & \vdots & \ddots & \vdots \\ e_{P,1} & e_{P,2} & \cdots & e_{P,N+M} \end{bmatrix}, y = \begin{bmatrix} y_1 \\ y_2 \\ \vdots \\ y_P \end{bmatrix} \quad (8)$$

Matrix E and vector y in equation (8) are built using formulae:

$$E = \begin{bmatrix} g_1(x_1, y_1) & g_2(x_1, y_1) & \cdots & g_{N+M}(x_1, y_1) \\ g_1(x_2, y_2) & g_2(x_2, y_2) & \cdots & g_{N+M}(x_2, y_2) \\ \vdots & \vdots & \ddots & \vdots \\ g_1(x_P, y_P) & g_2(x_P, y_P) & \cdots & g_{N+M}(x_P, y_P) \end{bmatrix},$$

$$y = \begin{bmatrix} I_n(x_1, y_1) - R_{ref}(x'_1, y'_1) + G_x(x'_1, y'_1)\tilde{A}x(x_1, y_1) + G_y(x'_1, y'_1)\tilde{A}y(x_1, y_1) \\ I_n(x_2, y_2) - R_{ref}(x'_2, y'_2) + G_x(x'_2, y'_2)\tilde{A}x(x_2, y_2) + G_y(x'_2, y'_2)\tilde{A}y(x_2, y_2) \\ \vdots \\ I_n(x_P, y_P) - R_{ref}(x'_P, y'_P) + G_x(x'_P, y'_P)\tilde{A}x(x_P, y_P) + G_y(x'_P, y'_P)\tilde{A}y(x_P, y_P) \end{bmatrix}$$

$G_x(x,y)$ and $G_y(x,y)$ are values of the horizontal and vertical gradients of the reference frame $R_{ref}(x,y)$ calculated using following formula:

$$G_x(x,y) = R_{ref}(x+1, y) - R_{ref}(x-1, y),$$

$$G_y(x,y) = R_{ref}(x, y+1) - R_{ref}(x, y-1)$$

The pixel values of $R_{ref}(x,y)$, $G_x(x,y)$ and $G_y(x,y)$ are defined only for integer coordinates x and y. When x or y are non-integer, the pixel value is calculated e.g. using a bilinear interpolation of closest pixels with integer coordinates.

Step 3 is QR Factorisation. QR factorisation of a matrix is as such well known and a suitable algorithm is described in D. H. Golub and C. van Loan, "Matrix computation" 2nd edition, The Johns Hopkins University Press, 1989. This algorithm can be used to decompose matrix E into a product of two matrices $$E = Q R \quad (9)$$

In other words, R is a representation of E in coordinates of Q. Q is preferably orthonormal and such that R is upper triangular, i.e. rows N+M+1 to P of R are all zero.

In this step an auxiliary vector z is also calculated where $$z = Q^T y \quad (10)$$

In step 4 the output of the QR motion analyser block is calculated. The output comprises a matrix $R^1$ consisting of the N+M first rows of matrix R and a vector $z^1$ consisting of the first N+M elements of z.

Figure 4:
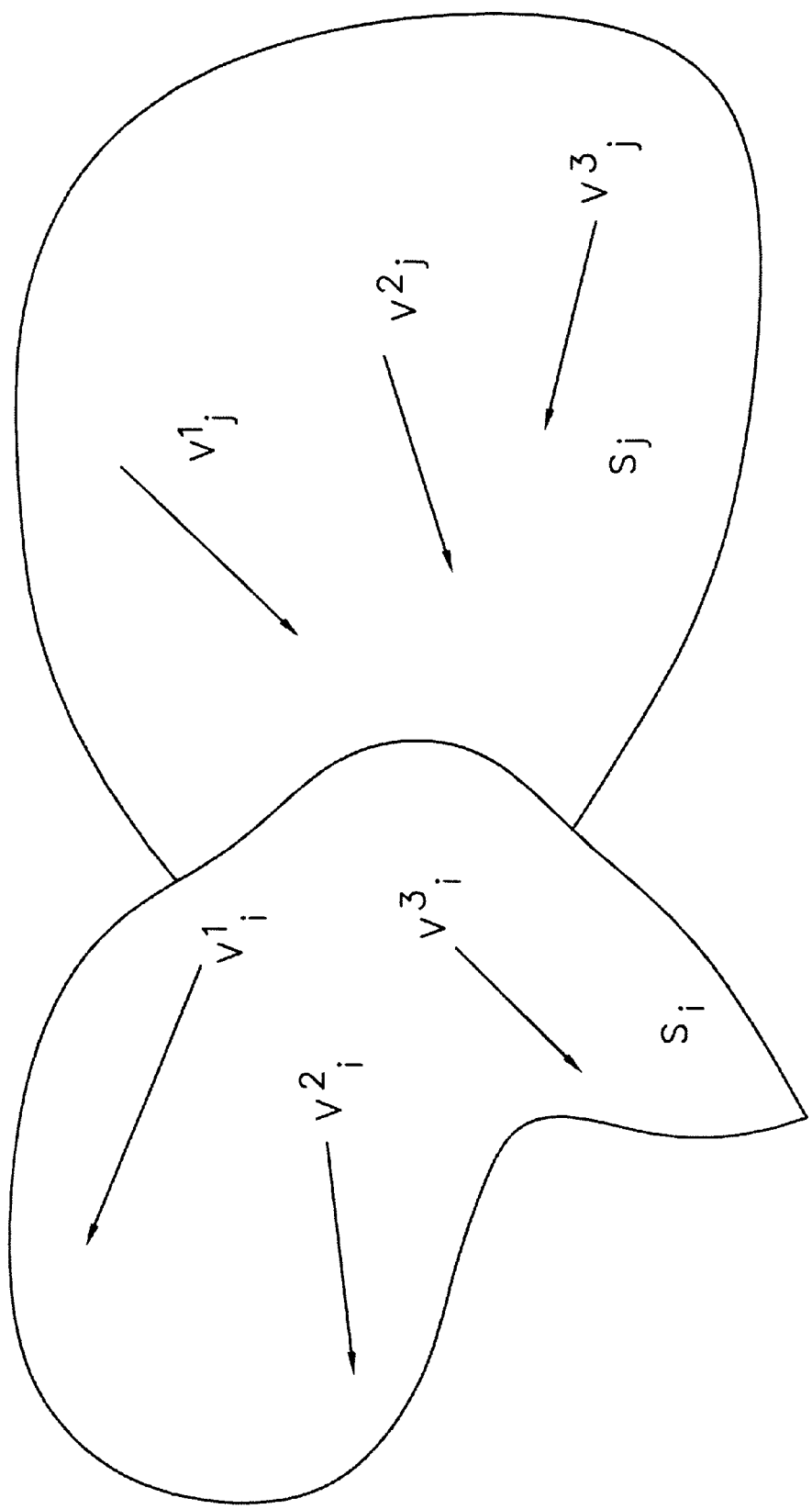
FIG. 4 illustrates merging by motion field approximation.

In the segment merging block the merging operation is performed for pairs of adjacent segments $S_i$ and $S_j$, see FIG. 4, by judging whether for a combined segment $S_{ij}$ the motion vector field can be represented using a common motion field described by motion coefficient vector $c_{ij}$. The merging operation consists of the following steps:

Step 1 comprises matrix calculation. This invention utilises a previously unknown property that motion coefficient vector $c_{ij}$ minimising the prediction error in the merged segment $S_{ij}$ also minimise the scalar value $$\left( \begin{bmatrix} R_i^1 \\ R_j^1 \end{bmatrix} c_{ij} - \begin{bmatrix} z_i^1 \\ z_j^1 \end{bmatrix} \right)^T \left( \begin{bmatrix} R_i^1 \\ R_j^1 \end{bmatrix} c_{ij} - \begin{bmatrix} z_i^1 \\ z_j^1 \end{bmatrix} \right) \quad (11)$$

where $R_i^1$, $z_i^1$ and $R_j^1$, $z_k^1$ are already produced by the QR analyser block for segments $S_i$ and $S_j$, respectively, as described above. This minimisation of (11) is equivalent to solving in the least square sense the overdetermined system of equations $$\begin{bmatrix} R_i^1 \\ R_j^1 \end{bmatrix} c_{ij} = \begin{bmatrix} z_i^1 \\ z_j^1 \end{bmatrix} \quad (12)$$

Step 2 comprises triangularisation of the matrices obtained in step 1. If QR factorisation of E for segment $S_i$, that is $E_i$, and of E for segment $S_j$, that is $E_j$, according to the teaching of the afore-mentioned document is applied, matrices $R_i^1$, $R_j^1$ are upper triangular and the system $$\begin{bmatrix} R_i^1 \\ R_j^1 \end{bmatrix} c_{ij} = \begin{bmatrix} z_i^1 \\ z_j^1 \end{bmatrix}$$

in (12) has the form:

$$\begin{bmatrix} X & X & X & \ldots & X \\ & X & X & \ldots & X \\ & & X & \ldots & X \\ & & & \ddots & \vdots \\ & & & & X \\ X & X & X & \ldots & X \\ & X & X & \ldots & X \\ & & X & \ldots & X \\ & & & \ddots & \vdots \\ & & & & X \end{bmatrix} \begin{bmatrix} c_1 \\ c_2 \\ c_3 \\ \vdots \\ c_{N+M} \end{bmatrix} = \begin{bmatrix} z_1^i \\ z_2^i \\ z_3^i \\ \vdots \\ z_{N+M}^i \\ z_1^j \\ z_2^j \\ z_3^j \\ \vdots \\ z_{N+M}^j \end{bmatrix} \quad (13)$$

where symbol x denotes a nonzero element and $Z_k^i$ denotes the $k^{th}$ element of vector $Z_k^i$, $Z_k^j$ denotes the $k^{th}$ element of vector $z_j^1$.

The system of equation (13) is triangularised by applying a series of multiplications of rows by scalars followed by additions of the rows; i.e. it is converted to the form:

$$\begin{bmatrix} r_{1,1} & r_{1,2} & r_{1,3} & \ldots & r_{1,N+M} \\ 0 & r_{2,2} & r_{2,3} & \ldots & r_{2,N+M} \\ 0 & 0 & r_{3,3} & \ldots & r_{3,N+M} \\ 0 & 0 & 0 & \ddots & \vdots \\ 0 & 0 & 0 & 0 & r_{N+M,N+M} \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \begin{bmatrix} c_1 \\ c_2 \\ c_3 \\ \vdots \\ c_{N+M} \end{bmatrix} = \begin{bmatrix} z_1 \\ z_2 \\ z_3 \\ \vdots \\ z_{N+M} \\ q_1 \\ q_2 \\ q_3 \\ \vdots \\ q_{N+M} \end{bmatrix} \quad (14)$$

For this triangularisation again QR factorisation according to said document mentioned above may be used.

In step 3 the merging error is evaluated. The change of the square prediction error $\Delta E_{ij}$ in the segment $S_{ij}$ caused by merging of segments $S_i$ and $S_j$ is calculated according to $$\Delta E_{ij} = \sum_{k=1}^{N+M} q_k^2 \quad (15)$$

In this preferred embodiment, QR factorisation of (13) results in Q being orthonormal, such that equation 15 is very simple. However, depending on the properties of Q in this factorisation, $\Delta E_{ij}$ is in general a function of $q_k^2$, k=1, ..., N+M, if the square prediction error is used as a measure for prediction error; of course, other measures for prediction error are feasible and accordingly, other functional relations between $q_k$ and $\Delta E_{ij}$ may be adopted.

Finally, in step 4 the segments are merged if the change of square prediction error in formula (15) is acceptable according to a chosen criterion. The segment merging block uses the following strategy for segment merging:

a. a threshold t is selected which corresponds to the allowed increase of square prediction error in the whole frame;

b. $\Delta E_{ij}$ is calculated for all pairs of adjacent segments using equation (15);

c. the pair of segments with the smallest $\Delta E_{ij}$ is merged.

d. steps b–c are repeated until the sum of $\Delta E_{ij}$ corresponding to all merged pairs of segments is greater than t.

For triangularisation of the system in equation (13) a sequence of Givens rotations can be used.

For the resulting new segment $S_{ij}$, a matrix $R_{ij}^1$ and vector $z_{ij}^1$ are built by taking the first N+M rows of the system in equation (14), i.e. these are given by:

$$R_{ij}^1 = \begin{bmatrix} r_{1,1} & r_{1,2} & r_{1,3} & \ldots & r_{1,N+M} \\ & r_{2,2} & r_{2,3} & \ldots & r_{2,N+M} \\ & & r_{3,3} & \ldots & r_{3,N+M} \\ & & & \ddots & \vdots \\ & & & & r_{N+M,N+M} \end{bmatrix}, z_{ij}^1 = \begin{bmatrix} z_1 \\ z_2 \\ z_3 \\ \vdots \\ z_{N+M} \end{bmatrix} \quad (16)$$

After all pairs of segments in the frame are considered, the output of the segment merging block is obtained. The output comprises three kinds of information. Firstly, it gives a new division of the image with a reduced number of segments. Secondly, for each new segment the block outputs matrix $R_k^1$ and vector $z_k^1$. Thirdly, it gives merging information which is sent to the decoder and helps the decoder to identify segments which were merged.

The motion coefficients $c_k=(c_1,c_2, \ldots c_{N+M})$ for the segment $S_k$ could be now calculated by solving the system of equations $R_k^1 c_k^1 = z_k^1$ but their calculation is not yet necessary if the coefficient removal block 33 is used. Also, as will be described further below, at this stage and prior to performing coefficient removal it may be advantageous to orthogonalise the motion field model with respect to the segments obtained from segment merging in orthogonalisation block 32b. This block receives as input the partitioning of the current frame into segments and for every segment $S_k$ matrices $R_k^1$ and $Z_k^1$ shown in (16) from the segment merging block. In this orthogonalisation block the polynomial basis functions $f_i(\cdot)$ are replaced by orthogonal polynomials $\tilde{f}_i(x,y)$. Then the motion vector field of this segment can be represented as:

$$\Delta \tilde{x}(x, y) = \sum_{i=1}^{N} \tilde{c}_i \tilde{f}_i(x, y) \quad (17a)$$

$$\Delta \tilde{y}(x, y) = \sum_{i=N+1}^{N+M} \tilde{c}_i \tilde{f}_i(x, y) \quad (17b)$$

Although the motion vector field in equations 4a and 4b is fully equivalent to the one in equations 17a and 17b, the latter is used because coefficients $\tilde{c}_i$ are less sensitive to quantisation than $c_i$ and hence can be represented with fewer bits.

Computation of the orthogonal polynomial basis functions is performed as follows both in the video encoder and in the video decoder, based on the shape of each segment and on the predefined basis functions $f_i$ of the motion model.

In general well known orthogonalisation algorithms, e.g. the Gramm-Schmidt algorithm, can be used to convert ordinary polynomials to polynomials orthogonal in an arbitrary shaped segment area. However, it is computationally much less complex to orthogonalise the motion field basis functions with respect to the rectangle circumscribing the given segment.

Orthogonalisation with respect to the rectangle circumscribing the given segment can be performed as follows. For a rectangle of $N_1 \times N_2$ pixels two sequences of one dimensional polynomials, e.g Legendre polynomials, are computed:

1. $g_k(x)$, k=0,1, . . . orthogonal on the interval $[1,N_1]$,
2. $h_l(y)$, l=0,1, . . . orthogonal on the interval $[1,N_2]$, The two dimensional (2-D) orthogonal polynomial basis functions $\tilde{f}_i(x,y)$, i=1, . . . , N+M are built as a tensor product of 1-D orthogonal polynomials:

$$\tilde{f}_i(x,y) = g_k(x) h_l(y) \tag{18}$$

Details on the choice of polynomials can be taken from A. Akansu and R. Haddad, "Multiresolution Signal Decomposition", Academic Press Inc., USA, 1992, pages 55 to 56.

Orthogonal polynomial basis functions $\tilde{f}_i(\cdot)$ are chosen so that they can be represented as a linear combination of polynomial basis functions $f_k(\cdot)$, k=1,2, . . . , i, i.e., $$\tilde{f}_i(x,y) = \sum_{k=1}^{i} t_{k,i} f_k(x,y), \, i = 1, 2, \ldots, N+M \tag{19}$$

This assumption guarantees that conversion from non-orthogonal to orthogonal basis functions can be implemented with a low computational complexity by simple matrix multiplications.

Matrices $R_k^1$ and $Z_k^1$ describing the motion vector field of the segment need to be recomputed to reflect the change of the basis functions from $f_i(\cdot)$ to their orthogonal version $\tilde{f}_i(\cdot)$. New matrices $\tilde{R}_k^1$ and $\tilde{Z}_k^1$ corresponding to orthogonal polynomial basis functions $\tilde{f}_i(\cdot)$ which satisfy equation (19) can be computed using matrix $R_k^1$ and vector $Z_k^1$ according to following formulae:

$$\tilde{R}_k^1 = R_k^1 T \tag{20}$$

$$\tilde{Z}_k^1 = Z_k^1 \tag{21}$$

Matrix T is given by $$T = \begin{bmatrix} t_{1,1} & t_{1,2} & t_{1,3} & \cdots & t_{1,N+M} \\ 0 & t_{2,2} & t_{2,3} & \cdots & t_{2,N+M} \\ 0 & 0 & t_{3,3} & \cdots & t_{3,N+M} \\ \vdots & \vdots & \vdots & \ddots & \vdots \\ 0 & 0 & 0 & \cdots & t_{N+M,N+M} \end{bmatrix} \tag{22}$$

where elements $t_{k,i}$ are taken from equation (23). The new motion vector coefficients $\tilde{c}_k^1 = (\tilde{c}_1, \tilde{c}_2, \ldots, \tilde{c}_{N+M})$ for the segment $S_{ij}$ corresponding to orthogonal polynomial basis functions $\tilde{f}_i(\cdot)$, i=1, . . . , N+M, can be calculated using coefficients $c_k = (c_1, \ldots, c_{N+M})$ corresponding to polynomial basis functions $f_i(\cdot)$, i=1, . . . , N+M, $$\tilde{c}_k^1 = T^{-1} c_k \tag{23}$$

or by solving the system of equations:

$$\tilde{R}_k^1 \tilde{c}_k^1 = \tilde{z}_k^1 \tag{24}$$

The coefficient removal block 33 receives as its input said new division of the current frame into segments and for every segment $S_k$ it receives said matrices $\tilde{R}_k^1$, $\tilde{z}_k^1$, produced previously by the orthogonalisation block. Motion vectors of every segment are represented by N+M motion coefficients, N and M being determined by the motion field model for $\Delta x$ and $\Delta y$.

The motion coefficient removal block 33 determines for a given segment $S_k$ whether it is possible to simplify the motion field model, without excessively increasing the prediction error. A simplified motion field model is obtained when some basis functions are removed from the model in equations (17a) and (17b) and fewer coefficients are required to describe such a simplified motion field model.

The following procedure is performed by block 33 for all segments in order to find out whether the $i^{th}$ basis function (and $i^{th}$ coefficient) can be removed from the motion field model:

Step 1 includes a matrix modification, where the system of linear equations (24)

$$\tilde{R}_k^1 \tilde{c}_k^1 = \tilde{z}_k^1$$

is modified by removing $i^{th}$ column from $\tilde{R}_k^1$ and $i^{th}$ element from $\tilde{c}_k^1$.

Step 2 includes a matrix triangularisation, preferably using said QR factorisation algorithm described in the above-mentioned document, or using a sequence of Givens rotations. That is, the system in equation (24) is triangularised in a manner known as such, by applying a series of multiplications of rows by scalars followed by additions of the rows, i.e. it is converted to the form:

$$\begin{bmatrix} \tilde{r}_{1,1} & \tilde{r}_{1,2} & \tilde{r}_{1,3} & \cdots & \tilde{r}_{1,N+M-1} \\ 0 & \tilde{r}_{2,2} & \tilde{r}_{2,3} & \cdots & \tilde{r}_{2,N+M-1} \\ 0 & 0 & \tilde{r}_{3,3} & \cdots & \tilde{r}_{3,N+M-1} \\ 0 & 0 & 0 & \ddots & \vdots \\ 0 & 0 & 0 & 0 & \tilde{r}_{N+M-1,N+M-1} \\ 0 & 0 & 0 & 0 & 0 \end{bmatrix} \begin{bmatrix} \tilde{c}_1 \\ \tilde{c}_2 \\ \tilde{c}_3 \\ \vdots \\ \tilde{c}_{N+M-1} \end{bmatrix} = \begin{bmatrix} \tilde{z}_1 \\ \tilde{z}_2 \\ \tilde{z}_3 \\ \vdots \\ \tilde{z}_{N+M-1} \\ \tilde{q}_1 \end{bmatrix} \tag{25}$$

Step 3 includes error evaluation. The change of the square prediction error for the segment caused by removal of the $i^{th}$ coefficient is simply equal to the term $\tilde{q}^2_i$ in equation (25). Again, this is valid based on Q in said QR factorisation being orthonormal. In general, depending on the properties of Q and the measure for prediction error, the change of the square prediction error is a function of $\tilde{q}_i$.

Step 4 includes removal of coefficients. If the change of the prediction error is acceptable according to a chosen criterion then the coefficient $c_i$ is removed from the coefficient vector. The new number of coefficients is now N+M−1. Matrix $\tilde{R}_k^1$ and vector $\tilde{z}_k^1$ are modified e.g. by means of QR factorisation to form:

$$\tilde{R}_k^1 = \begin{bmatrix} \tilde{r}_{1,1} & \tilde{r}_{1,2} & \tilde{r}_{1,3} & \cdots & \tilde{r}_{1,N+M-1} \\ & \tilde{r}_{2,2} & \tilde{r}_{2,3} & \cdots & \tilde{r}_{2,N+M-1} \\ & & \tilde{r}_{3,3} & \cdots & \tilde{r}_{3,N+M-1} \\ & & & \ddots & \vdots \\ & & & & \tilde{r}_{N+M-1,N+M-1} \end{bmatrix}, \tilde{z}_k^1 = \begin{bmatrix} \tilde{z}_1 \\ \tilde{z}_2 \\ \tilde{z}_3 \\ \vdots \\ \tilde{z}_{N+M-1} \end{bmatrix} \tag{26}$$

The number of coefficients for the segment can be reduced further by repeating the steps 1–4 based on equation (26).

In the motion coefficient removal block the following strategy for coefficient removal is used:

a. a threshold t is selected which corresponds to an allowed increase of square prediction error in the whole frame;

b. $\tilde{q}_i^2$ is calculated for all segments and their basis functions using equation (25);

c. a basis function of a segment with smallest $\tilde{q}_i^2$ is removed;

d. steps b–c are repeated until the sum of all $\tilde{q}_i^2$ terms corresponding to all removed basis functions in different segments is greater than t.

Finally, step 5 includes coefficient calculation. After removal of suitable coefficients in this step the final motion coefficients for a segment $S_k$ are calculated by solving the system of linear equations (24):

$$\tilde{R}_k^1 \tilde{c}_k = \tilde{z}_k^1$$

where matrix $\tilde{R}_k^1$ and vector $\tilde{z}_k^1$ are the result of the previous steps 1–4. The equation can be solved using one of well known algorithms, e.g. backsubstitution.

Figure 2:
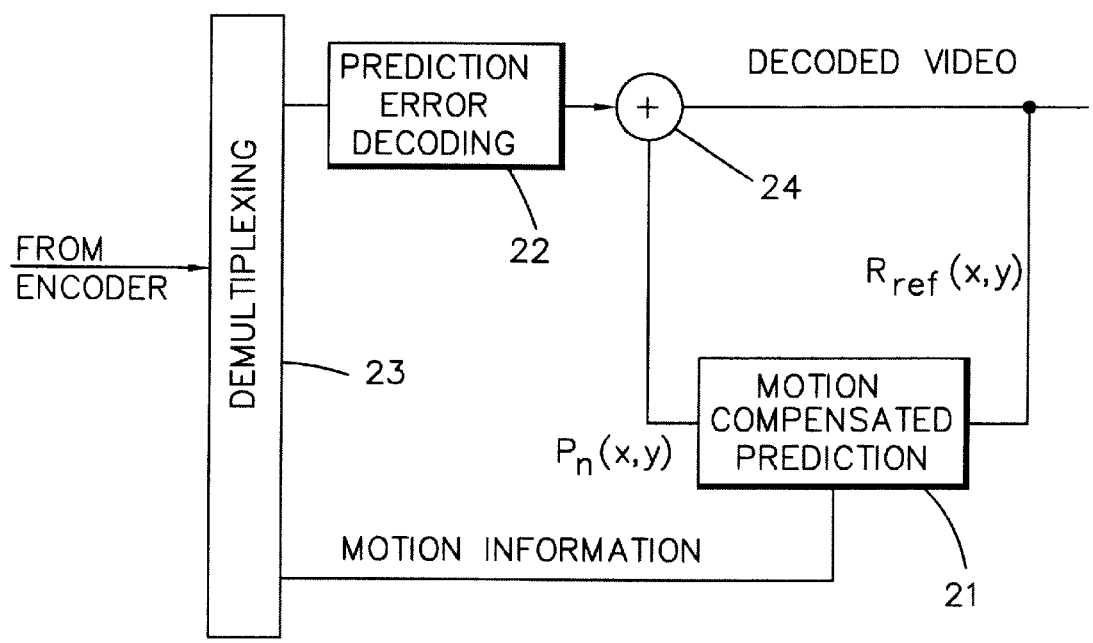
FIG. 2 is a schematic diagram of a known decoder.
Figure 3:
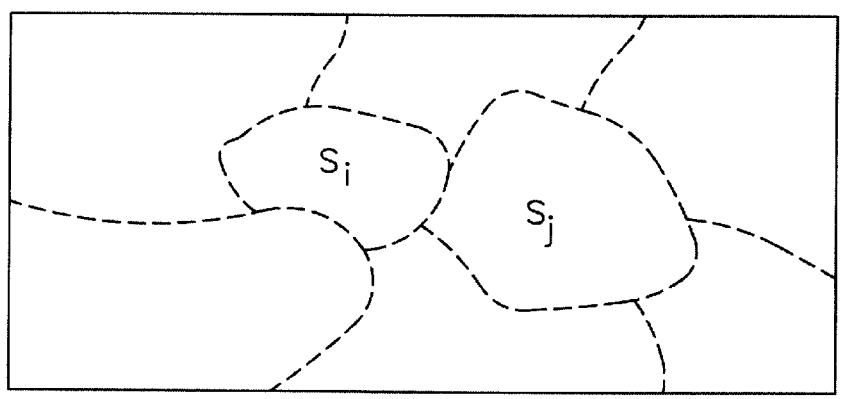
FIG. 3 depicts adjacent segments for merging.
Figure 7:
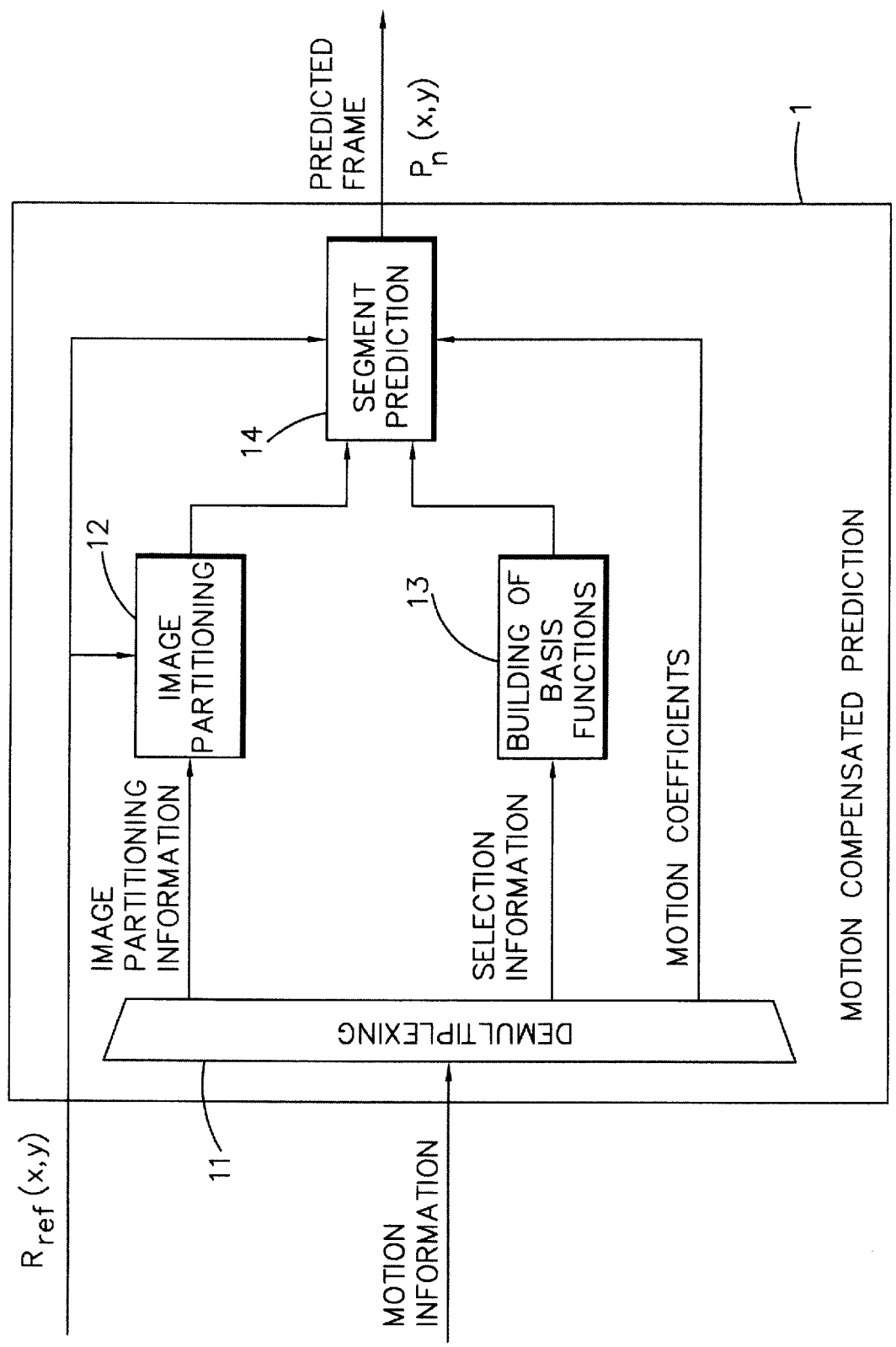
FIG. 7 is a schematic diagram of a motion compensated prediction block according to an embodiment of the present invention.

FIG. 7 shows an embodiment of motion compensated prediction block 1 of FIG. 1. This block receives motion information output by motion field coding block 3 and furthermore receives a reference frame $R_{ref}(x,y)$. Based on this information, block 1 outputs a predicted frame $P_n(x,y)$. As shown in FIG. 7, motion compensated prediction bock 1 comprises a demultiplexer 11 receiving multiplexed motion information from motion field encoding block 3 and outputting demultiplexed motion information components, i.e. image partitioning information, coefficient selection information and, finally, the value of the transmitted motion coefficients. Reference numeral 12 denotes an image partitioning block receiving said image partitioning information and said reference frame $R_{ref}$ and outputting segments of the frame resulting from partitioning the image according to the image partitioning information. Reference numeral 13 denotes a basis functions building block. This block selects from a predefined set of basis functions the particular basis functions indicated in the selection information generated by the motion coefficient removal block 33 in motion field encoding block 3. Reference numeral 14 denotes a segment prediction block which receives for each segment of said reference frame $R_{ref}$ the associated selection of basis functions and the associated motion coefficients, calculates the motion vectors [$\Delta x$, $\Delta y$] and based on these motion vectors, calculates the predicted frame $P_n(x,y)$ for each pixel (x,y) of each segment. Motion compensated prediction block 1 corresponds in its structure and function to motion compensated prediction block 21 of the video decoder depicted in FIG. 2. Both motion compensated prediction blocks base the prediction on the motion information output by motion field coding block 3 of the video encoder shown in FIG. 1.

Figure 8:
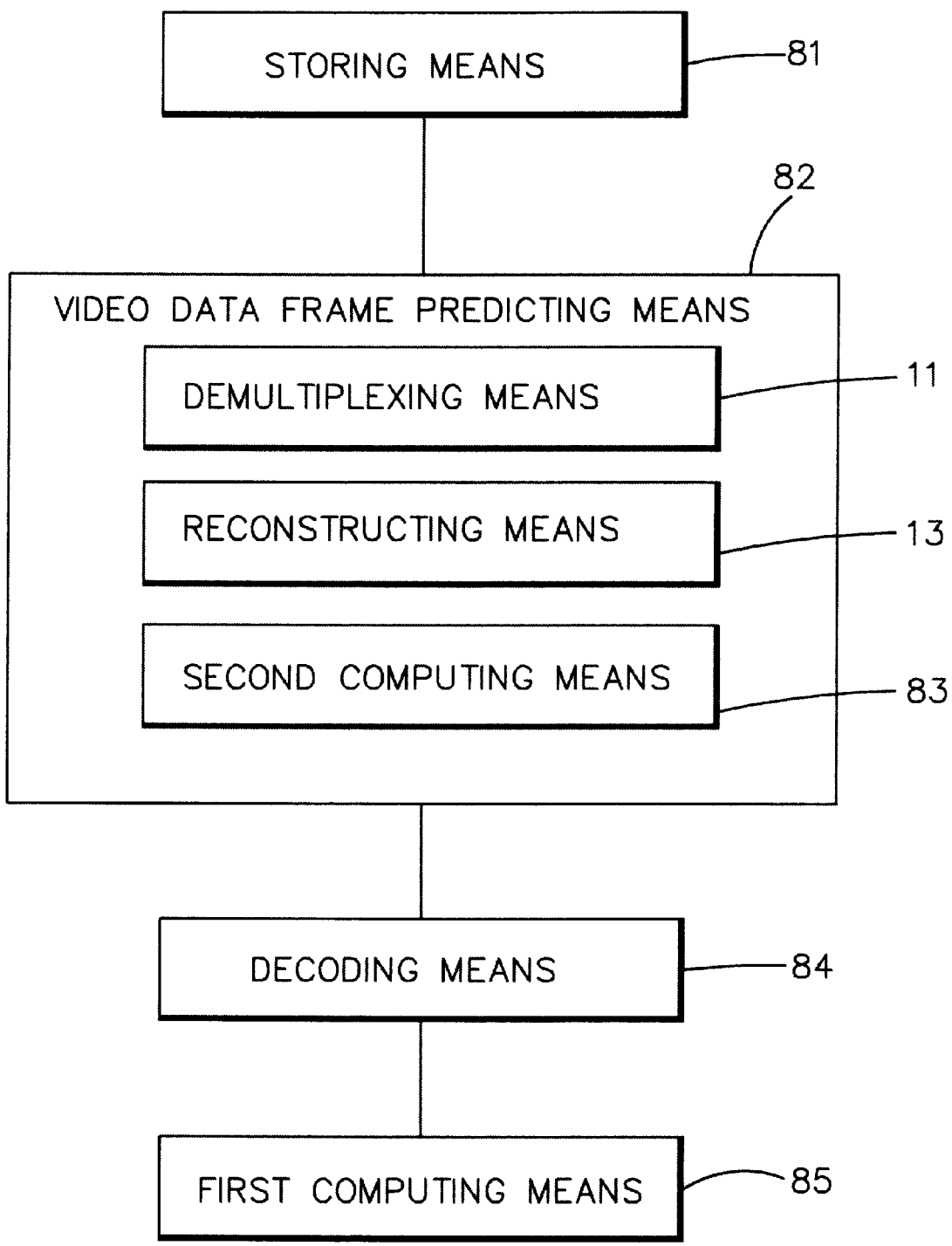
FIG. 8 is a block diagram of a decoder according to an embodiment of the present invention.

FIG. 8 is a block diagram of a motion compensated prediction block according to an embodiment of the present invention. The figure shows the main blocks of an decoder according, comprising:

means 81 for storing a video data frame;

means 82 for predicting a video data frame based on said stored video data frame and on received motion information;

means 84 for decoding received prediction error data and obtaining a prediction error frame; and means 85 for calculating and outputting an updated video data frame based on said predicted video data frame and said decoded prediction error frame, and storing the updated video data frame in said storing means;

said means for predicting a video data frame comprising means 11 for demultiplexing received motion data into at least two of the following: data concerning the partitioning of said updated video data frame into segments $S_i$, data concerning a selection of basis functions from a set of motion field model basis functions, and data concerning coefficients of selected basis functions;

means 13 for reconstructing said motion vector field in each segment $S_i$ from a linear combination of said selected basis functions and coefficients; and means 83 for calculating said prediction frame based on said reconstructed motion vector field and based on said stored video data frame.

As a result of all of the steps in all the blocks, the motion field encoder according to the invention produces merging information for informing the decoder which segments are merged, selection information informing the decoder which basis functions are removed and motion coefficient information.

The main advantage of the present invention over prior art solutions is its ability to reduce the amount of motion information by a large factor without causing a large increase of prediction error. Additionally the complexity of the overall system is low which allows practical implementation on available signal processors or general purpose microprocessors.

The segment merging block has the ability of finding motion vectors of combined segments from given motion vectors estimated for separate segments. It can be proven that the motion vectors it produces are in fact optimal in terms of maintaining low square error for the combined segment. This explains the ability of this block to dramatically reduce the number of segments with only very modest increase of square prediction error.

Use of an orthogonalisation block according to the invention provides a motion field model which is less sensitive to quantisation errors and therefore fewer bits can be used to quantise the motion coefficients.

The motion coefficient removal block is a very powerful tool for instantaneous adaptation of the motion model to the actual amount and type of motion in the video scene. This block can easily test the result of prediction (value of square prediction error for a segment) with a very large number of models, e.g., with all possible combinations of motion field basis functions. A strong advantage of this scheme is that it does not need to repeat the process of motion estimation and hence is computationally simple.

By using motion estimation followed by QR motion analysis the motion field coder can find new motion coefficients for any desired combination of image segments or any desired model of the motion field in the segment by solving very simple systems of linear equations.

According to the present invention the segment merging, orthogonalisation and coefficient removal blocks are preferably combined to provide a greater degree of motion data reduction with a small reduction of image quality.

The system can be implemented in a variety of ways without departing from the spirit and the scope of the invention. For instance, different linear motion models can be used in equation (3). Different methods can be used to linearise the term in the formula (5). Further, different criteria may be used to decide whether to merge or not to merge two segments. The strategy for deciding whether a given basis function should be removed from the model may vary. Triangularisation of matrices in equations (12) and (24) can be performed using various algorithms and calculation of final coefficients by solving equation (24) can be done using a number of known algorithms for solving systems of linear equations. Different interpolation methods may also be used to determine the values of $R_{ref}(x,y)$, $G_x(x,y)$ and $G_y(x,y)$ at non-integer coordinates.

What is claimed is:

1. Encoder for performing motion compensated encoding of video data, comprising:

motion field estimating means, having an input for receiving a first video data frame $I_n$ and a reference frame $R_{ref}$, said motion field estimating means being arranged to estimate a motion vector field describing scene motion displacements of video frame pixels;

motion field encoding means having an input to receive from said motion field estimating means said estimated motion vector field; partitioning information indicating partitioning of a video frame into at least two segments said segments being a first segment $S_i$ and a second segment $S_j$; said motion field encoding means being arranged to obtain compressed motion information comprising first motion coefficients representing said motion vector field;

motion compensated prediction means for predicting a predicted video data frame based on said reference frame $R_{ref}$ and said compressed motion information;

computing means having an input for receiving said first video data frame and said predicted video data frame, said computing means being arranged to calculate a prediction error frame based on said predicted video data frame and on said first video data frame;

prediction error encoding means for encoding said prediction error frame;

wherein said motion encoding means further comprises:
means for calculating for each segment a distortion matrix E and a distortion vector y such that a predefined measure $\Delta E$ for distortion in each segment, due to approximating said motion vector field as coefficients $c_i$ of a set of polynomial basis function $f_i$, is a function of (Ec−y), c being a vector of said motion coefficients $c_i$;

means for decomposing said distortion matrix E into a first matrix Q and a second matrix R such that
det Q≠0 and
Q R=E,
a subset of the set of all columns of matrix Q being a basis of a vector space defined by all possible linear combinations of all column vectors of matrix E, columns of matrix Q being orthogonal to each other;

means for calculating an auxiliary vector z according to $z=Q^{-1}y$, $Q^{-1}$ being the inverse matrix of said first matrix Q;

means for generating for each segment a column extended matrix A comprising the columns of matrix R and vector z as an additional column, and for selecting all rows of matrix A which have elements unequal to zero in all columns due to matrix R;

means for merging segments based on selective combination of segments producing an increase in said prediction error within a certain limit;

means for generating a row extended matrix B comprising said selected rows of matrix A of said first segment $S_i$ and said selected rows of matrix A of said second segment $S_j$;

means for performing a series of multiplications of rows of matrix B with scalars unequal to zero and additions of rows of matrix B in order to obtain a modified matrix B' having in the columns due to matrix R as many rows as possible filled with zeros;

orthogonalising means receiving one of said matrices A, B and B' as an input matrix M, said orthogonalising means being arranged to replace said polynomial basis functions $f_i$ by orthogonal basis functions $\tilde{f}_i$ and to calculate second motion coefficients $\tilde{c}$ using said orthogonal basis functions and said input matrix M; and quantisation means for quantising said second coefficients $\tilde{c}$.

2. Encoder for performing motion compensated encoding of video data, comprising:
motion field estimating means, having an input for receiving a first video data frame $I_n$ and a reference frame $R_{ref}$, said motion field estimating means being arranged to estimate a motion vector field describing motion displacements of video frame pixels;

motion field encoding means having an input to receive from said motion field estimating means said estimated motion vector field; partitioning information indicating partitioning of a video frame into at least two segments said segments being a first segment $S_i$ and a second segment $S_j$; said motion field encoding means being arranged to obtain compressed motion information comprising first motion coefficients representing said motion vector field;

motion compensated prediction means for predicting a predicted video data frame based on said reference frame $R_{ref}$ and said compressed motion information;

computing means having an input for receiving said first video data frame and said predicted video data frame, said computing means being arranged to calculate a prediction error frame based on said predicted video data frame and on said first video data frame;

prediction error encoding means for encoding said prediction error frame;

wherein said motion encoding means further comprises:
means, for calculating for each segment a distortion matrix E and a distortion vector y such that a predefined measure $\Delta E$ distortion in each segment, due to approximating said motion vector field as coefficients $c_i$ of a set of polynomial basis function $f_i$, is a function of (E c−y), c being a vector of said motion coefficients $c_i$;

means for decomposing said distortion matrix E into a first matrix Q and a second matrix R such that
det Q≠0, and
Q R=E,
a subset of the set of all columns of matrix Q being a basis of a vector space defined by all possible linear combinations of all column vectors of matrix E, columns of matrix Q being orthogonal to each other;

means for calculating an auxiliary vector z according to $z=Q^{-1}y$, $Q^{-1}$ being the inverse matrix of said first matrix Q;

means for generating for each segment a column extended matrix A comprising the columns of matrix R and vector z as an additional column, and for selecting all rows of matrix A which have elements unequal to zero in all columns due to matrix R;

means for merging segments based on selective combination of segments producing an increase in said prediction error within a certain limit;

means for generating a row extended matrix B comprising said selected rows of matrix A of said first segment $S_i$ and said selected rows of matrix A of said second segment $S_j$;

means for performing a series of multiplications of rows of matrix B with scalars unequal to zero and additions of rows of matrix B in order to obtain a modified matrix B' having in the columns due to matrix R as many rows as possible filled with zeros;

orthogonalising means receiving on of said matrices A, B and B' as an input matrix M, said orthogonalising means being arranged to replace said polynomial basis functions $f_i$ by orthogonal basis functions $\tilde{f}_i$ and to modify said input matrix to a third matrix $\tilde{M}$ corresponding to said orthogonal basis functions;

removing means having an input for receiving of said third matrix $\tilde{M}$, said removing means being arranged to modify said third matrix by removing from said third matrix the $i^{th}$ column due to R corresponding to the $i^{th}$ basis function of said orthogonal basis functions, and said removing means having an output to provide a matrix $\hat{M}$;

means for computing second motion coefficients $\tilde{c}$ using said fourth matrix $\hat{M}$; and quantisation means for quantizing said second motion coefficients $\tilde{c}$.

3. Encoder according to claim 1, wherein said orthogonalisation means comprises:

means for choosing orthogonal basis functions $\tilde{f}_i(\cdot)$ as linear combinations of polynomial basis functions $f_k(\cdot)$, $k=1,2,\ldots,i$, wherein $$\tilde{f}_i(x,y) = \sum_{k=1}^{i} t_{k,i} f_k(x,y), i = 1, 2, \ldots, N+M$$

where k and i are indexes, t values are multipliers and N+M is the number of coefficients representing the motion vector field of a given segment.

4. Encoder according to claim 2, wherein said orthogonalisation means comprises:

means for choosing orthogonal basis functions $\tilde{f}_i(\cdot)$ as linear combinations of polynomial basis functions $f_k(\cdot)$, $k=1,2,\ldots,i$, wherein $$\tilde{f}_i(x,y) = \sum_{k=1}^{i} t_{k,i} f_k(x,y), i = 1, 2, \ldots, N+M$$

where k and i are indexes, t values are multipliers and N+M is the number of coefficients representing the motion vector field of a given segment.

5. Encoder according to claim 3, wherein said motion field encoding means further comprises:

means for computing $\tilde{c}$ using the relationship $$R^1 T \tilde{c} = z^1$$

wherein $$T = \begin{bmatrix} t_{1,1} & t_{1,2} & t_{1,3} & \cdots & t_{1,N+M} \\ 0 & t_{2,2} & t_{2,3} & \cdots & t_{2,N+M} \\ 0 & 0 & t_{3,3} & \cdots & t_{3,N+M} \\ \vdots & \vdots & \vdots & \ddots & \vdots \\ 0 & 0 & 0 & \cdots & t_{N+M,N+M} \end{bmatrix};$$

matrix $R^1$ contains the columns of said matrix M due to said matrix R; and said vector $Z^1$ contains a column of matrix M due to vector z.

6. Encoder according to claim 2, wherein said motion field encoding means further comprises:

means for computing a matrix $\tilde{R}^1$ and a vector $\tilde{z}^1$ satisfying the following formulae:

$$\tilde{R}^1 = R^1 T,$$

$$\tilde{Z}^1 = Z^1, \text{ wherein}$$

$$T = \begin{bmatrix} t_{1,1} & t_{1,2} & t_{1,3} & \cdots & t_{1,N+M} \\ 0 & t_{2,2} & t_{2,3} & \cdots & t_{2,N+M} \\ 0 & 0 & t_{3,3} & \cdots & t_{3,N+M} \\ \vdots & \vdots & \vdots & \ddots & \vdots \\ 0 & 0 & 0 & \cdots & t_{N+M,N+M} \end{bmatrix};$$

matrix $R^1$ contains the columns of said matrix M due to said matrix R;

said vector $z^1$ contains a column of matrix M due to vector z; and means for computing $\tilde{c}$ according to the following equation:

$$\hat{R}^1 \tilde{c} = \hat{z}^1;$$

wherein matrix $\hat{R}^1$ contains the columns of said matrix $\hat{M}$ due to said matrix R; and vector $\hat{z}^1$ contains a column of matrix $\hat{M}$ due to said vector z.

7. Method of motion compensated encoding of video data, comprising the steps:

a) receiving a first video data $I_n$ and a reference frame $R_{ref}$, estimating a motion vector field describing motion displacements of video frame pixels, and outputting said first video frame, said motion vector field and said reference frame $R_{ref}$;

b) receiving said estimated motion vector field; partitioning information indicating partitioning of a video frame into at least two segments, said segments being a first segment $S_i$ and a second segment $S_j$, for obtaining compressed motion information comprising first motion coefficients representing said motion vector field;

c) predicting a predicted video data frame based on said reference frame $R_{ref}$ and said compressed motion information;

d) receiving said first video data frame to calculate a prediction error frame based on said predicted video data frame and on said first video data frame;

e) encoding said prediction error frame;

wherein said method further comprises the steps:

g) calculating for each segment a distortion matrix E and a distortion vector y such that a predefined measure $\Delta E$ for distortion in each segment, due to approximating said motion vector field as coefficients $c_i$ of a set of polynomial basis functions $f_i$, is a function of (E c−y), c being a vector of said motion coefficients $c_i$;

h) decomposing said distortion matrix E into a first matrix Q and a second matrix R such that det Q≠0 and

Q R=E, a subset of the set of all columns of matrix Q being a basis of a vector space defined by all possible linear combinations of all column vectors of matrix E, columns of matrix Q being orthogonal to each other;

i) calculating an auxiliary vector z according to $z=Q^{-1} y$, $Q^{-1}$ being the inverse matrix of said first matrix Q;

j) generating for each segment a column extended matrix A comprising the columns of matrix R and vector z as an additional column, and for selecting all rows of matrix A which have elements unequal to zero in all columns due to R;

k) merging segments based on selective combination of segments producing an increase in said prediction error within a certain limit;

l) generating a row extended matrix B comprising said selected rows of matrix A of said first segment $S_i$ and said selected rows of matrix A of said second segment $S_j$;

m) performing a series of multiplications of rows of matrix B with scalars unequal to zero and additions of rows of matrix B in order to obtain a modified matrix B' having in the columns due to matrix R as many rows as possible filled with zeros;

o) receiving one of said matrices A, B and B' as an input matrix M in order to replace said polynomial basis functions $f_i$ by orthogonal basis functions $\tilde{f}_i$ and to calculate second motion coefficients $\tilde{c}$ using said orthogonal basis functions and said input matrix M; and q) quantising said second motion coefficients $\tilde{c}$.

8. Method of motion compensated encoding of video data, comprising the steps:

a) receiving a first video data frame $I_n$ and a reference frame $R_{ref}$, estimating a motion vector field describing motion displacements of video frame pixels, and outputting said first video frame, said motion vector field and said reference frame $R_{ref}$;

b) receiving said estimated motion vector field; partitioning information indicating partitioning of a video frame into at least two segments, said segments being a first segment $S_i$ and a second segment $S_j$, for obtaining compressed motion information comprising first motion coefficients representing said motion vector field;

c) predicting a predicted video data frame based on said reference frame $R_{ref}$ and said compressed motion information;

d) receiving said first video data frame to calculate a prediction error frame based on said predicted video data frame and on said first video data frame;

e) encoding said prediction error frame;

wherein said method further comprises the steps:

g) calculating for each segment a distortion matrix E and a distortion vector y such that a predefined measure ΔE for distortion in each segment, due to approximating said motion vector field as coefficients $c_i$ of a set of polynomial basis functions $f_i$, is a function of (E c−y), c being a vector of said motion coefficients $c_i$;

h) decomposing said distortion matrix E into a first matrix Q and a second matrix R such that
det Q≠0 and
Q R=E,
a subset of the set of all columns of matrix Q being a basis of a vector space defined by all possible linear combinations of all column vectors of matrix E, columns of matrix Q being orthogonal to each other;

i) calculating an auxiliary vector z according to $z=Q^{-1} y$, $Q^{-1}$ being the inverse matrix of said first matrix Q;

j) generating for each segment a column extended matrix A comprising the columns of matrix R and vector z as an additional column, and for selecting all rows of matrix A which have elements unequal to zero in all columns due to matrix R;

k) merging segments based on selective combination of segments producing an increase in said prediction error within a certain limit;

l) generating a row extended matrix B comprising said selected rows of matrix A of said first segment $S_i$ and said selected rows of matrix A of said second segment $S_j$;

m) performing a series of multiplications of rows of matrix B with scalars unequal to zero and additions of rows of matrix B in order to obtain a modified matrix B' having in the columns due to matrix R as many rows as possible filled with zeros;

n) receiving one of said matrices A, B, and B' as an input matrix M in order to replace said polynomial basis functions $f_i$ by orthogonal basis functions $\tilde{f}_i$ and to modify said input matrix to a third matrix $\tilde{M}$ corresponding to said orthogonal basis functions;

o) receiving said third matrix $\tilde{M}$ to modify said third matrix $\tilde{M}$ to a fourth matrix $\hat{M}$ by removing from said third matrix $\tilde{M}$ the $i^{th}$ column due to matrix R corresponding to the $i^{th}$ basis function of said orthogonal basis functions, and outputting said fourth matrix $\hat{M}$;

p) computing second motion coefficients $\tilde{c}$ using said fourth matrix $\hat{M}$; and q) quantising said second motion coefficients $\tilde{c}$.

9. Method of motion compensated encoding of video data according to claim 7, wherein said method further comprises the step choosing orthogonal basis functions $\tilde{f}_i(\cdot)$ as linear combinations of polynomial basis functions $f_k(\cdot)$, k=1,2, ..., i, wherein $$\tilde{f}_i(x, y) = \sum_{k=1}^{i} t_{k,i} f_k(x, y), i = 1, 2, \ldots, N+M$$

Where k and i are indexes, t values are multipliers and N+M is the number of coefficients representing the motion vector field of a given segment.

10. Method of motion compensated encoding of video data according to claim 8, wherein said method further comprises the step choosing orthogonal basis functions $\tilde{f}_i(\cdot)$ as linear combinations of polynomial basis functions $f_k(\cdot)$, k=1,2, ..., i, wherein $$\tilde{f}_i(x, y) = \sum_{k=1}^{i} t_{k,i} f_k(x, y), i = 1, 2, \ldots, N+M$$

where k and i are indexes, t values are multipliers and N+M is the number of coefficients representing the motion vector field of a given segment.

11. Method of motion compensated encoding of video data according to claim 9, wherein said method further comprises the step of:

computing $\tilde{c}$ using the relationship $R^1 T \tilde{c} = z^1$:

wherein $$T = \begin{bmatrix} t_{1,1} & t_{1,2} & t_{1,3} & \cdots & t_{1,N+M} \\ 0 & t_{2,2} & t_{2,3} & \cdots & t_{2,N+M} \\ 0 & 0 & t_{3,3} & \cdots & t_{3,N+M} \\ \vdots & \vdots & \vdots & \ddots & \vdots \\ 0 & 0 & 0 & \cdots & t_{N+M,N+M} \end{bmatrix};$$

matrix $R^1$ contains the columns of said matrix M due to said matrix R; and vector $z^1$ contains a column of said matrix M due to said vector z.

12. Method of motion compensated encoding of video data according to claim 10, wherein said method further comprises the steps computing a matrix $\tilde{R}^1$ and a vector $\tilde{z}^1$ satisfying following formulae:

$$\tilde{R}^1 = R^1 T,$$

$$\tilde{z}^1 = Z^1, \text{ wherein}$$

$$T = \begin{bmatrix} t_{1,1} & t_{1,2} & t_{1,3} & \cdots & t_{1,N+M} \\ 0 & t_{2,2} & t_{2,3} & \cdots & t_{2,N+M} \\ 0 & 0 & t_{3,3} & \cdots & t_{3,N+M} \\ \vdots & \vdots & \vdots & \ddots & \vdots \\ 0 & 0 & 0 & \cdots & t_{N+M,N+M} \end{bmatrix};$$

wherein $R^1$ contains the columns of said matrix M due to said matrix R;

vector $z^1$ contains a column of said matrix M due to said vector z; and computing $\tilde{c}$ according to the following equation:

$$\hat{R}^1 \tilde{c} = \hat{z}^1;$$

wherein matrix $\hat{R}^1$ contains the columns of said matrix $\hat{M}$ due said matrix R; and vector $\hat{z}^1$ contains column of matrix $\hat{M}$ due to said vector z.

13. Decoder for decoding of motion compensation encoded video data, said decoder comprising:

means for storing a video data frame;

means for predicting a video data frame based on said stored video data frame and on received motion information;

means for decoding received prediction error data and obtaining a prediction error frame; and means for calculating and outputting an updated video data frame based on said predicted video data frame and said decoded prediction error frame, and storing the updated video data frame in said storing means;

said means for predicting a video data frame comprising:

means for demultiplexing received motion data into at least two of the following: data indicating partitioning of said updated video data frame into segments $S_k$, data indicating a selection of basis functions from a set of motion field model basis functions, and data indicating coefficients of selected basis functions;

means for reconstructing said motion vector field in each segment $S_k$ from a linear combination of said selected basis functions and coefficients; and means for calculating said prediction frame based on said reconstructed motion vector field and based on said stored video data frame.

14. Decoder according to claim 13, wherein said means for reconstructing said motion vector field is adapted to receive data regarding the structure of each member of said set of basis functions for each segment $S_i$ of said updated video data frame. said stored video data frame.

15. Decoder for decoding of motion compensation encoded video data, said decoder comprising:

means for storing a video data frame;

means for predicting a video data frame based on said stored video data frame and on received motion information;

means for decoding received prediction error data and obtaining a prediction error frame; and means for calculating and outputting an updated video data frame based on said predicted video data frame and said decoded prediction error frame, and storing the undated video data frame in said storing means;

said means for predicting a video data frame comprising:

means for demultiplexing received motion data into at least two of the following: data indicating partitioning of said undated video data frame into segments $S_k$, data indicating a selection of basis functions from a set of motion field model basis functions, and data indicating coefficients of selected basis functions;

means for reconstructing said motion vector field in each segment $S_k$ from a linear combination of said selected basis functions and coefficients; and means for calculating said prediction frame based on said reconstructed motion vector field and based on said stored video data frame;

wherein said means for reconstructing said motion vector field is adapted to calculate said set of motion field model basis functions for each segment $S_k$ as being orthogonal to each other with respect to an area determined by the shape of the segment $S_k$.

16. System for handling video data, comprising an encoder for performing motion compensated encoding of video data and a decoder for decoding motion compensated video data, said encoder comprising:

motion field estimating means, having an input for receiving a first video data frame $I_n$ and a reference frame $R_{ref}$, said motion field estimating means being arranged to estimate a motion vector field describing motion displacements of video frame pixels;

motion field encoding means having an input to receive from said motion field estimating means said estimated motion vector field; partitioning information indicating partitioning of a video frame into at least two segments said segments being a first segment $S_i$ and a second segment $S_j$; said motion field encoding means being arranged to obtain compressed motion information comprising first motion coefficients representing said motion vector field;

motion compensated prediction means for predicting a predicted video data frame based on said reference frame $R_{ref}$ and said compressed motion information;

computing means having an input for receiving said first video data frame and said predicted video data frame, said computing means being arranged to calculate a prediction error frame based on said predicted video data frame and on said first video data frame;

prediction error encoding means for encoding said prediction error frame;

said motion encoding means further comprising:

means for calculating for each segment a distortion matrix E and a distortion vector y such that a predefined measure $\Delta E$ for distortion in each segment, due to approximating said motion vector field as coefficients $c_i$ of a set of polynomial basis functions $f_i$, is a function of (E c−y), c being a vector of said motion coefficients $c_i$;

means for decomposing said distortion matrix E into a first matrix Q and a second matrix R such that det Q≠0 and

Q R=E, a subset of the set of all columns of matrix Q being a basis of a vector space defined by all possible linear combinations of all column vectors of matrix E, columns of matrix Q being orthogonal to each other;

means for calculating an auxiliary vector z according to $z=Q^{-1}$ y, $Q^{-1}$ being the inverse matrix of said first matrix Q;

means for generating for each segment a column extended matrix A comprising the columns of matrix R and vector z as an additional column, and for selecting all rows of matrix A which have elements unequal to zero in all columns due to R;

means for merging segments based on selective combination of segments producing an increase in said prediction error within a certain limit;

means for generating a row extended matrix B comprising said selected rows of matrix A of said first segment $S_i$ and said selected rows of matrix A of said second segment $S_j$;

means for performing a series of multiplications of rows of matrix B with scalars unequal to zero and additions of rows of matrix B in order to obtain a modified matrix B' having in the columns due to matrix R as many rows as possible filled with zeros;

orthogonalising means receiving one of said matrices A, B and B' as an input matrix M, said orthogonalising means being arranged to replace said polynomial basis function $f_i$ by orthogonal basis functions $\tilde{f}_i$ and to calculate second motion coefficients $\tilde{c}$ using said orthogonal basis functions and said input matrix M; and quantisation means for quantizing said second coefficients $\tilde{c}$;

and said decoder comprising:

means for storing a video data frame;

means for predicting video data fame based on said stored video data frame and on received motion information;

means for decoding received prediction error data and obtaining a prediction error frame; and means for calculating and outputting an updated video data frame based on said predicted video data frame and said decoded prediction error frame, and storing the updated video data frame in said storing means;

said means for predicting a video data frame further comprising:

means for demultiplexing received motion data into at least two of the following: data indicating partitioning of said updated video data frame into segments $S_k$, data indicating a selection of basis functions from a set of motion field model basis functions, and data indicating coefficients of selected basis functions;

means for reconstructing said motion vector field in each segment $S_k$ from a linear combination of said selected basis functions and corresponding coefficients; and means for calculating said prediction frame based on said reconstructed motion vector field and based on said stored video data frame.

17. System for handling video data, comprising an encoder for performing motion compensated encoding of video data and a decoder for decoding motion compensated video data, said encoder comprising:

motion field estimating means having an input for receiving a first video data frame $I_n$ and a reference frame $R_{ref}$, said motion field estimating means being arranged to estimate a motion vector field describing motion displacements of video frame pixels;

motion field encoding means having an input to receive from said motion field estimating means said estimated motion vector field; partitioning information indicating partitioning of a video frame into at least two segments said segments being a first segment $S_i$ and a second segment $S_j$; said motion field encoding means being arranged to obtain compressed motion information comprising first motion coefficients representing said motion vector field;

motion compensated prediction means for predicting a predicted video data frame based on said reference frame $R_{ref}$ and said compressed motion information;

computing means having an input for receiving said first video data frame and said predicted video data frame, said computing means being arranged to calculate a prediction error frame based on said predicted video data frame and on said first video data frame;

prediction error encoding means for encoding said prediction error frame;

said motion encoding means further comprising:

means for calculating for each segment a distortion matrix E and a distortion vector y such that a predefined measure $\Delta E$ for distortion in each segment, due to approximating said motion vector field as coefficients $c_i$ of a set of polynomial basis functions $f_i$, is a function of (E c−y), c being a vector of said motion coefficients $c_i$;

means for decomposing said distortion matrix E into a first matrix Q and a second matrix R such that det Q≠0, and

Q R=E, a subset of the set of all columns of matrix Q being a basis of a vector space defined by all possible linear combinations of all column vectors of matrix E, columns of matrix Q being orthogonal to each other;

means for calculating an auxiliary vector z according to $z=Q^{-1}$ y, $Q^{-1}$ being the inverse matrix of said first matrix Q;

means for generating for each segment a column extended matrix A comprising the columns of matrix R and vector z as an additional column, and for selecting all rows of matrix A which have elements unequal to zero in all columns due to matrix R;

means for merging segments based on selective combination of segments producing an increase in said prediction error within a certain limit;

means for generating a row extended matrix B comprising said selected rows of matrix A of said first segment $S_i$ said selected rows of matrix A of said second segment $S_j$;

means for performing a series of multiplications of rows of matrix B with scalars unequal to zero and additions of rows of matrix B in order to obtain a modified matrix B' having in the columns due to matrix R as many rows as possible filled with zeros;

orthogonalising means receiving one of said matrices A, B and B' as an input matrix M, said orthogonalising means being arranged to replace said polynomial basis functions $f_i$ by orthogonal basis functions $\tilde{f}_i$ and to modify said input matrix to a third matrix $\tilde{M}$ corresponding to said orthogonal basis functions;

removing means having an input for receiving said third matrix $\tilde{M}$, said removing means being arranged to modify said third matrix by removing from said third matrix the $i^{th}$ column due to R corresponding to the $i^{th}$ basis function of said orthogonal basis functions, and said removing means having an output to provide a fourth matrix $\hat{M}$;

means for computing second motion coefficients $\tilde{c}$ using said fourth matrix $\hat{M}$; and quantisation means for quantizing said second motion coefficients $\tilde{c}$;

and said decoder comprising:
means for storing a video data frame;
means for predicting a video data frame based on said stored video data frame and on received motion information;
means for decoding received prediction error data and obtaining a prediction error frame; and
means for calculating and outputting an updated video data frame based on said predicted video data frame and said decoded prediction error frame, and storing the updated video data frame in said storing means;
said means for predicting a video data frame comprising:
means for demultiplexing received motion data into at least two of the following: data concerning a partitioning of said updated video data frame into segments $S_k$, data concerning a selection of basis functions from a set of motion field model basis functions, and data concerning coefficients of selected basis functions;
means for reconstructing said motion vector field in each segment $S_k$ from a linear combination of said selected basis functions and corresponding coefficients; and
means for calculating said prediction frame based on said reconstructed motion vector field and based on said stored video data frame.

18. System for handling video data according to claim 16, further comprising means to transmit video data from said encoder to said decoder.

19. System for handling video data according to claim 16, further comprising means to store video data encoded using said encoder and means to decompress encoded video data by said decoder.

20. System for handling video data according to claim 17, further comprising means to transmit video data from said encoder to said decoder.

21. System for handling video data according to claim 17, further comprising means to store video data encoded by said encoder and means to decompress encoded video data by said decoder.

22. Method of decoding motion compensation encoded video data, said method comprising:

storing a video data frame;
predicting a video data frame based on said stored video data frame and on received motion information;
decoding received prediction error data and obtaining a prediction error frame; and
calculating and outputting an updated video data frame based on said predicted video data frame and said decoded prediction error frame, and storing the updated video data frame;
predicting of a video data frame comprising:
demultiplexing received motion data into at least two of the following: basis function selection data indicating a selection of basis functions from a set of motion field model basis functions and coefficient values for selected basis functions, and partitioning data indicating the partitioning of said updated video data frame into segments Sk;
reconstructing said motion vector field in each segment Sk from a linear combination of said selected basis functions and corresponding coefficient values; and
calculating said prediction frame based on said reconstructed motion vector field and based on said stored video data frame.

23. Method of decoding of motion compensation encoded video data according to claim 22, wherein
said reconstructing of said motion vector field comprises receiving an indication of the structure of each member of said set of basis functions for each segment $S_k$ of said updated video data frame.

24. Method of decoding of motion compensation encoded video data according to claim 22, wherein
said reconstructing of said motion vector field comprises calculating said set of motion field model basis functions for each segment $S_k$ as being orthogonal to each other with respect to an area determined by the shape of the segment $S_k$.

25. Decoder for decoding of motion compensation encoded video data, said decoder comprising;
means for storing a video data frame;
means for predicting a video data frame based on said stored video data frame and on received motion information;
means for decoding received prediction error data and obtaining a prediction error frame; and
means for calculating and outputting an updated video data frame based on said predicted video data frame and said decoded prediction error frame, and storing the updated video data frame in said storing means;
said means for predicting a video data frame comprising:
means for demultiplexing received motion data into at least basis function selection data indicating a selection of basis functions from a set of motion field model basis functions and coefficient values for selected basis functions, and partitioning data indicating the partitioning of said updated video data frame into segments $S_k$;
means for reconstructing said motion vector field in each segment $S_k$ from a linear combination of said selected basis functions and corresponding coefficient values; and
means for calculating said prediction frame based on said reconstructed motion vector field and based on said stored video data frame.

26. Decoder according to claim 25, wherein
said means for reconstructing said motion vector field is adapted to receive an indication of the structure of each member of said set of basis functions for each segment $S_k$ of said updated video data frame.

27. Decoder according to claim 25, wherein
said means for reconstructing said motion vector field is adapted to calculate said set of motion field model basis functions for each segment $S_k$ as being orthogonal to each other with respect to an area determined by the shape of the segment $S_k$.

28. Encoder for performing motion compensated encoding of video data according to claim 1, further comprising:
means for transmitting said second motion coefficients and said prediction error frame to a decoder.

29. Encoder for performing motion compensated encoding of video data according to claim 2, further comprising:
means for transmitting said second motion coefficients and said prediction error frame to a decoder.

30. Method of motion compensated encoding of video data according to claim 7, further comprising the step:
f) transmitting said second motion coefficients and said prediction error frame to a decoder.

31. Method of motion compensated encoding of video data according to claim 8, further comprising the step:
f) transmitting said second motion coefficients and said prediction error frame to a decoder.

32. System according to claim 16, further comprising:
means for transmitting said second motion coefficients and said prediction error frame to a decoder.

33. System according to claim 17, further comprising:
means for transmitting said second motion coefficients and said prediction error frame to a decoder.

* * * * *